(12) United States Patent
Blair

(10) Patent No.: US 11,555,155 B2
(45) Date of Patent: Jan. 17, 2023

(54) APPARATUS, SYSTEM, AND METHOD FOR PROCESSING OF MATERIALS

(71) Applicant: John Blair, Calgary (CA)

(72) Inventor: John Blair, Calgary (CA)

( * ) Notice: Subject to any disclaimer, the term of this patent is extended or adjusted under 35 U.S.C. 154(b) by 313 days.

(21) Appl. No.: 16/672,341

(22) Filed: Nov. 1, 2019

(65) Prior Publication Data

US 2020/0308493 A1    Oct. 1, 2020

Related U.S. Application Data

(60) Provisional application No. 62/824,131, filed on Mar. 26, 2019.

(51) Int. Cl.

| | |
|---|---|
| *C10G 5/06* | (2006.01) |
| *C10G 9/24* | (2006.01) |
| *C10G 53/02* | (2006.01) |
| *B01D 5/00* | (2006.01) |
| *B01J 19/08* | (2006.01) |
| *B01F 23/233* | (2022.01) |
| *B01F 27/271* | (2022.01) |

(52) U.S. Cl.
CPC ............. *C10G 53/02* (2013.01); *B01D 5/006* (2013.01); *B01D 5/0054* (2013.01); *B01F 23/233* (2022.01); *B01F 27/2712* (2022.01); *B01J 19/087* (2013.01); *B01J 2219/0854* (2013.01); *B01J 2219/0871* (2013.01); *B01J 2219/0884* (2013.01); *C10G 2300/1025* (2013.01); *C10G 2300/1037* (2013.01)

(58) Field of Classification Search
CPC ... C10G 5/06; C10G 9/24; B01D 5/006; B01J 2219/0884; B01J 2219/0871; B01J 19/087
See application file for complete search history.

(56) References Cited

U.S. PATENT DOCUMENTS

| | | | | |
|---|---|---|---|---|
| 4,826,573 A | * | 5/1989 | Schippers | B01J 19/126 201/19 |
| 2002/0141911 A1 | * | 10/2002 | Ishii | B01D 53/8662 422/174 |
| 2013/0067800 A1 | * | 3/2013 | Wahdan | C10L 1/00 44/300 |
| 2013/0317238 A1 | * | 11/2013 | Mohanty | B01J 8/087 549/266 |
| 2015/0259607 A1 | * | 9/2015 | Chen | C10G 1/10 585/241 |
| 2021/0284920 A1 | * | 9/2021 | Chalifoux | C10G 1/065 |

FOREIGN PATENT DOCUMENTS

WO     2012135525     10/2012

* cited by examiner

*Primary Examiner* — Randy Boyer
(74) *Attorney, Agent, or Firm* — Parlee McLaws LLP; Kirsten Macmillan Oates

(57) ABSTRACT

System, apparatuses, and methods for processing feedstock have a decomposing stage for breaking down feedstock into liquid and gaseous products and a condensing stage for condensing gaseous products to a liquid condensate. A mixing stage can also be used to combine gaseous and liquid feedstock portions into a combined liquid feedstock to be fed to the decomposing stage. The decomposing stage can be one or more flux tanks having a field generator for creating an electromagnetic field through the flux tank configured to decompose feedstock inside. The condensing stage can have a catalyst tank, distillation tank, condensing pipes, or a combination thereof. The mixing stage can be a reformer device having pairs of plates, at least some of the plates are capable of rotating to generate a shear force that creates a cavitation effect to combine the gaseous and liquid feedstock portions.

19 Claims, 17 Drawing Sheets

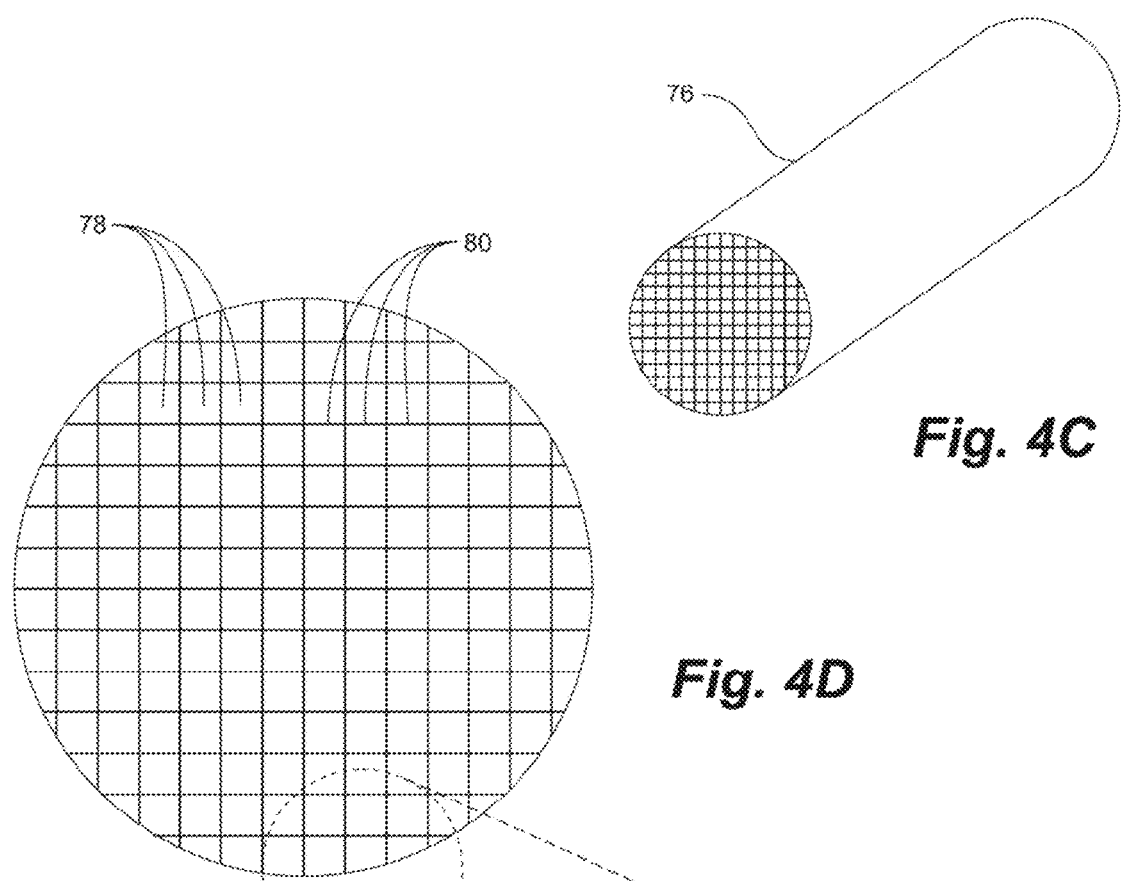
Fig. 4C
Fig. 4D
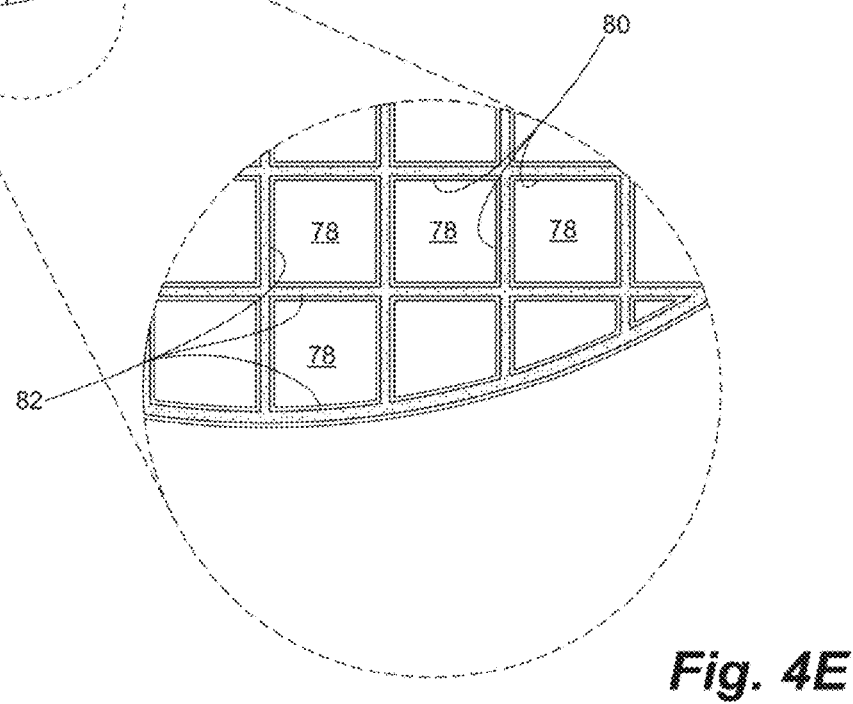
Fig. 4E

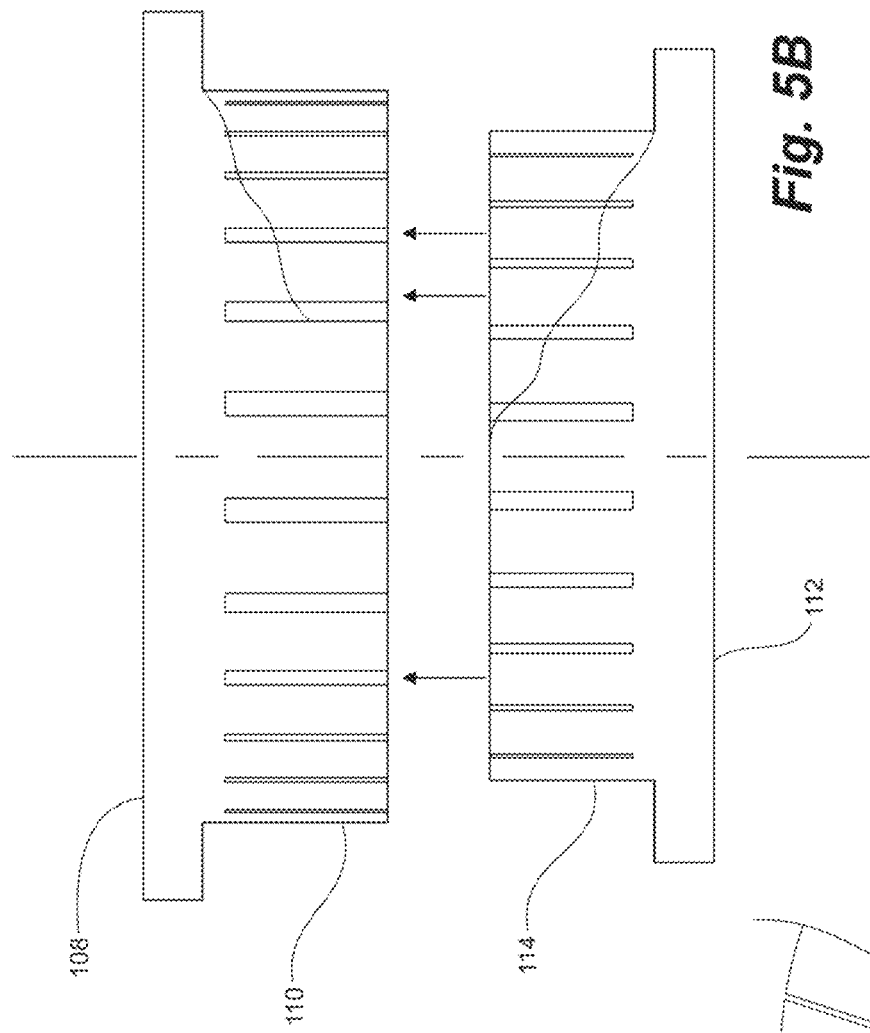
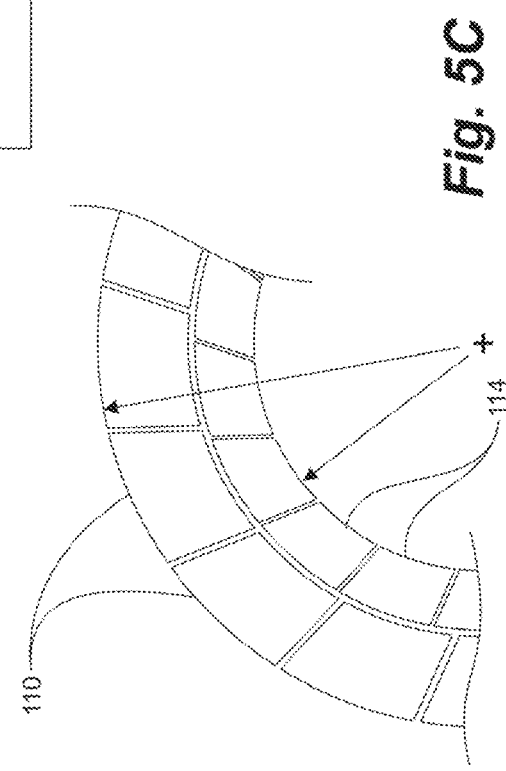

APPARATUS, SYSTEM, AND METHOD FOR PROCESSING OF MATERIALS

CROSS-REFERENCE TO RELATED APPLICATIONS

This application claims the benefit of U.S. Provisional Patent application Ser. No. 62/824,131, filed Mar. 26, 2019, the entirety of which is incorporated herein by reference

FIELD

Embodiments herein relate to the processing of materials. In particular, embodiments herein relate to an apparatus, system, and method of processing various feedstock materials into saleable products.

BACKGROUND

Various known processes can be used to process waste or other unusable materials into saleable products. For example, gaseous, liquid, or solid hydrocarbons, plastics, and other organic or inorganic feedstock materials can be processed into saleable products such as natural gas condensate via pyrolysis, and the related technologies and products derived therefrom. Pyrolysis involves the thermal decomposition of materials in an inert (i.e. substantially oxygen free) environment at high temperatures, for example at about 400-900° C. During pyrolysis, heat is used to break the chemical bonds in the molecules of feedstock by exceeding the decomposition temperature of the feedstock. Pyrolysis of carbon-based feedstock produces condensable and non-condensable gases, as well as residue such as char. The condensable gases can be condensed and stored, or undergo further treatment to produce products such as gasoline, diesel, synthetic gas, or other saleable hydrocarbons.

Current pyrolysis systems and methods typically comprise the heating of feedstock in kilns, such as via combustible gases, inductive heating of the kiln, or molten metal baths, to a temperature sufficient to decompose the feedstock. For example, crude oil must be heated to about 500° C. to be pyrolyzed. Such heating requires a substantial amount of energy, some of which is wasted, as not all of the energy used in generating the heat is transferred to the feedstock.

Additionally, existing materials processing systems are very expensive to operate and require large-footprint refineries located remote from the feedstock source, such as a hydrocarbon reservoir. Illustrative of the costs, according to the Canadian Fuels Association, a standard medium-sized oil refinery has the capacity to produce over 100,000 bbls per day; a small refinery produces 25,000-100,000 bbls per day. The planning, designing, permitting, and construction of a new medium-sized refinery is a 5-7-year process, and costs about $7-10 billion, excluding the cost of land. Further, such refineries need to be in areas where there is a large amount of crude oil available and most often close to population centers.

In some material processing systems, catalysts are used to convert gases into liquid hydrocarbons, such as via the Fischer-Tropsch process. While the use of catalysts can assist in liquefying gases produced after the decomposition of feedstock, it can also be problematic, as catalysts are consumed during the process and must be replaced, necessitating the intermittent cessation of materials processing. Additionally, the resulting hydrocarbon liquid product produced via the catalyzed reaction can be waxy, or otherwise unsuitable, and must be further treated to produce saleable products.

Additionally, current processes used to liquefy feedstock are energy and/or water intensive. For example, currently natural gas hydrocarbons are liquified by using a process of super cooling and pressurizing the gas until it becomes a liquid. The liquefied hydrocarbons remain a liquid as long as they stay in a super-cooled pressurized state. Another method is to use a steam methane reformer, wherein gaseous hydrocarbon is flowed amongst $H_2O$ steam where the methane molecule of the hydrocarbon steals a hydrogen molecule from the $H_2O$ steam and the methane becomes any of the higher hydrocarbon classes C2-C12. This method is expensive and consumes a large amount of water and energy to complete the liquefaction process.

Further, the distillation tanks currently used for cooling and further condensing gases are inefficient, providing a low condensation rate, for example about 70%, and requiring high pressures to operate, such as at pressures greater than 1000 PSI.

SUMMARY

Generally, a system for processing feedstock, such as any organic and/or inorganic materials, for example gaseous, liquid, semiliquid, and/or solid hydrocarbons, is provided. The feedstock can be provided from a feedstock source such as a well head, pipeline, storage tank, refinery, or mine via any known transport methods. In an embodiment, the feedstock is broken down into liquid and gaseous products at a decomposing stage. The liquid products can be removed from the decomposing stage and stored or processed further. Uncondensed gaseous products are directed to a condensing stage to condense the gas to a liquid condensate, which is either stored or processed further. Gases not condensed by the condensing stage can be mixed with incoming feedstock, or directed to a subsequent processing stage. In embodiments, the system can further comprise a mixing stage upstream of the decomposing stage for combining gas and liquid feedstock portions into a combined liquid feedstock that is then conveyed to the decomposing stage. The system can comprise multiple processing stages, each processing stage having a mixing stage, decomposing stage, and/or condensing stage, or any combination thereof.

The mixing stage can comprise a reformer device configured to combine a gaseous feedstock portion with a liquid feedstock portion to produce a combined liquid feedstock. The reformer comprises a plurality of spinning plates, such as contra-rotating plates, that create a hydrodynamic cavitation effect caused by shear forces created by complementary teeth of the plates such that when gaseous and liquid feedstock portions enter, they pass between the teeth of the plates and become a combined liquid feedstock. In embodiments the spinning plates can be made at least partially of a magnetic material to ionize the feedstock therein.

The decomposing stage comprises at least one flux tank for receiving and decomposing the feedstock with an electromagnetic field generated by a field generator located adjacent the flux tank. The flux tank breaks down the feedstock therein into a gaseous and/or liquid product.

The condensing stage comprises one or more distillation tanks having cooling coils therein, the distillation tanks configured to receive the gaseous and/or liquid products and condense the gaseous products to a liquid condensate. In embodiments, the condensing stage further comprises one or more condensing pipes comprising a ceramic filter stack for receiving and condensing uncondensed cases from the distillation tanks. An electrical current can be passed through the cooling coils of the distillation tanks and/or conductive condensing pipes to create an electromagnetic field that assists with the condensing of gases.

In embodiments, a catalyst tank can be located upstream of the distillation tanks and configured to receive and at least partially condense gaseous products from the decomposing stage to a liquid condensate. The catalyst tank can comprise an accumulator element forming a lattice or other structure that defines a plurality of channels through which gaseous products may flow. The accumulator element comprises a non-reactive material having a catalyst material embedded therein selected to attract the gaseous products to the walls of the channels of the accumulator element. The gaseous products are cooled by the walls of the channels and condense thereon as liquid condensate, which are directed downstream to the distillation tanks for further condensation and/or collection.

In embodiments, a depolymerization tank can be located upstream of the mixing section and decomposition section and configured to receive and depolymerize solid feedstock into an intermediate gaseous product with an electromagnetic field generated by a field generator located adjacent the depolymerization tank. The gaseous product is then delivered to the mixing section or decomposition section for further processing, or condensed into a liquid condensate for storage or further processing. The depolymerization tank can be configured to rotate to more efficiently depolymerize the solid feedstock.

According to one or more embodiments, liquids that have completed the condensing process are directed to storage for transport, or further processing.

According to one or more embodiments, non-condensable gases that remain after passing through the condensing stage are recycled back to the mixing stage to be combined with incoming feedstock.

According to one or more embodiments, additional natural gases C1 through C12 travel from the feedstock source, or are circulated back from another stage of the system to the mixing stage to be mixed with a liquid feedstock portion.

In a broad aspect, a system for processing a decomposable feedstock comprises: a flux tank configured to receive the feedstock within and having a field generator configured to generate an electromagnetic field within the flux tank at a target frequency range to decompose the feedstock to produce a gaseous product from the combined feedstock; and a condensing stage having one or more distillation tanks for receiving and condensing the gaseous product to a liquid product.

In an embodiment, the target frequency range is between about 1 kHz to about 100 kHz.

In an embodiment, the system further comprises a mixing stage for combining a liquid portion and a gas portion to form the feedstock.

In an embodiment, the mixing stage comprises: a housing having a liquid inlet, gas inlet, and common outlet, and defining a mixing chamber having a driveshaft extending axially therethrough; one or more stationary plates mounted in the mixing chamber and generally perpendicular to the driveshaft, each stationary plate having at least a first circumferential array of a first plurality of teeth extending axially from the stationary plate in a first direction, first radial flow passages formed between adjacent first teeth; and one or more rotating plates, each rotating plate rotatably mounted on the driveshaft and having at least a second circumferential array of a second plurality of teeth extending axially from the rotating plate in a second direction, the second direction opposing the first direction and second radial flow passages formed between adjacent second teeth; wherein each stationary plate is coupled with a corresponding rotating plate to form a pair such that the at least a first circumferential array of the first plurality of teeth and the second circumferential array of the second plurality of teeth of corresponding stationary and rotating plates respectively occupy a common axial segment of the mixer, the first and second pluralities of teeth having a radial clearance therebetween, and the rotating plate is capable of being rotated relative to the corresponding stationary plate; a mixing flow path being formed through the first and second passages of the first circumferential arrays and the radial clearance; and wherein the liquid and gas flow along the flow path from the liquid and gas inlets respectively to the common outlet through the one or more pairs of stationary and rotating plates.

In an embodiment, at least one of the stationary plates and rotating plates are made at least partially of a magnetic material.

In an embodiment, the magnetic material is neodymium.

In an embodiment, the radial clearance between the first and second pluralities of teeth is in the range of about 200 μm to about 1500 μm.

In an embodiment, the system further comprises a catalyst located between the flux tank and distillation tanks for receiving and condensing the gaseous product to a liquid product.

In an embodiment, the catalyst comprises a catalyst material embedded within a non-reactive material.

In an embodiment, the non-reactive material forms a lattice having a plurality of axial channels.

In an embodiment, the one or more distillation tanks each have a cooling coil, and a current source electrically connected to the cooling coil for conducting a current therethrough.

In an embodiment, the system further comprises a return conduit to direct gaseous product not converted to liquid product in the condensing stage back to the mixing stage.

In an embodiment, the gaseous product not converted to liquid product in the condensing stage is directed to a subsequent processing stage of the system.

In an embodiment, the system further comprises a depolymerization tank located upstream from the flux tank, the depolymerization tank configured to receive a solid feedstock and having a second field generator configured to generate a depolymerizing electromagnetic field within the depolymerization tank at a second target frequency range to produce a second gaseous product from the combined feedstock.

In an embodiment, the depolymerization tank is rotatably mounted on a frame and driven to rotate the depolymerization tank.

In another broad aspect, a method for processing a decomposable feedstock comprises: mixing a liquid portion and a gas portion of the feedstock to form a combined feedstock; generating a first electromagnetic field to decompose the feedstock and produce a gaseous product therefrom; and condensing the gaseous product to produce a liquid product.

In an embodiment, mixing the liquid portion and gas portion of the feedstock comprises shearing the liquid portion and gas portion to cavitate the liquid portion in the presence of the gas portion.

In an embodiment, the step of condensing the gaseous product comprises condensing the gaseous product in the presence of a catalyst material.

In an embodiment, the step of condensing the gaseous product comprises cooling the gaseous product.

In an embodiment, the step of cooling the gaseous product further comprises exposing the gaseous product to a second electromagnetic field.

In another broad aspect, a feedstock processing apparatus comprises: a processing tank for receiving feedstock therein; a field generator configured to generate an electromagnetic field within the processing tank at a target frequency to produce a gaseous product from the feedstock, the field generator comprising a conductive wire coiled about a hollow pipe.

In an embodiment, the hollow pipe is coupled to a pump configured to circulate a coolant therethrough.

In an embodiment, the coolant contains ferromagnetic particles.

In another broad aspect, a catalyst device comprises: a housing defining a catalyst chamber therein; an inlet for receiving a gas product into the catalyst chamber; an accumulator element located in the chamber and comprising a catalyst material embedded within a non-reactive material; and an outlet for permitting a liquid product to exit the catalyst chamber; wherein the catalyst material is selected to attract the gas product.

In an embodiment, the accumulator forms a lattice defining a plurality of channels.

In an embodiment, the device further comprises a retaining plate located in the housing below the accumulator element, the retaining plate having a plurality of openings sized to permit the gas product to pass therethrough, but retain and direct at least some of the liquid product to the outlet.

In an embodiment, a generally upwardly extending circumferential lip surrounds each of the plurality of openings.

In another broad aspect, a method of manufacturing a catalyst accumulator element comprises: mixing the catalyst material with a ceramic clay to form a catalyst mixture comprising the catalyst material suspended in the ceramic clay; extruding the catalyst mixture to form an accumulator lattice; firing the lattice; and placing the lattice in an acid bath for removing the catalyst material from an outer surface of the lattice.

In an embodiment, the step of firing the lattice comprises firing the lattice for two or more cycles.

BRIEF DESCRIPTION OF THE DRAWINGS

FIG. 4C is a perspective view of an accumulator element of the catalyst tank of FIG. 4A;

FIG. 4D is an enlarged top view of the accumulator element of FIG. 4C;

FIG. 4E is an enlarged top cross-sectional view of the accumulator element of FIG. 4C, showing catalyst material embedded into the accumulator element;

FIG. 5B is a perspective view of a set of stationary and rotating plates of the reformer;

FIG. 5C is a cross-sectional view of the intermeshed teeth of the stationary and rotating plates of FIG. 5B;

DESCRIPTION

Figure 1A:
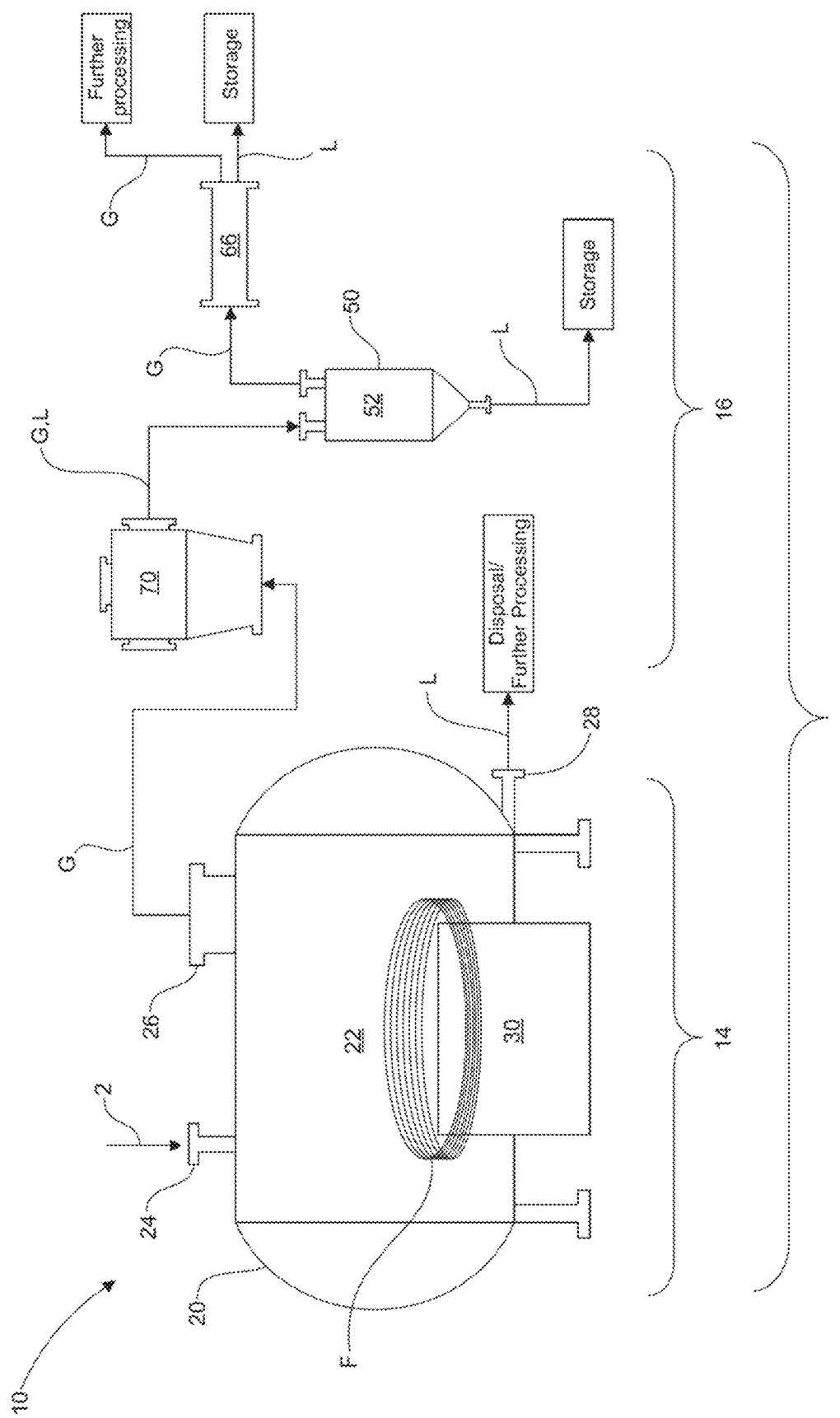
FIG. 1A is schematic diagram of an embodiment of a system for processing materials having a decomposing stage and a condensing stage.

A system, apparatus, and method for processing of organic and inorganic feedstock 2 into saleable products are disclosed herein. In embodiments, said feedstock 2 can be solid, semi-solid, liquid, or gaseous feedstock, or a combination thereof. For example, unstable, not-to-specification gaseous and/or liquid hydrocarbons can be used as feedstock 2. In other embodiments, the feedstock 2 can be plastics or any other material that is to be refined. The system and method described herein is scalable and can be portable to provide for processing of feedstock 2 in-situ, or otherwise close to the source thereof.

The feedstock processing system 10 comprises a decomposing stage 14 for breaking down feedstock 2 decomposable by electromagnetic radiation into intermediate products, and a condensing stage 16 for condensing gaseous products to a liquid form. In embodiments, the processing system 10 can also comprise a mixing stage 12 upstream of the decomposing stage 14 for combining a gaseous portion 2G and a liquid portion 2L to form a combined feedstock 2. Supply lines interconnect the various stages of the system 10 for communicating feedstock 2 and intermediate products towards processes and equipment downstream. A controller, such as a programmable logic controller, can be operatively connected with the various components of the system 2 for monitoring and controlling flow, heat, pressure, power, voltage, amperage, frequency, and other parameters of the process.

While some embodiments herein are concerned with the processing of hydrocarbon feedstock, such as the upgrading of not-to-specification gas and/or liquid hydrocarbon feedstock 2, for example natural gas to saleable hydrocarbon products, one of skill in the art would understand that a variety of other feedstock 2 may be processed using the system and methods disclosed herein.

Multiple Stages

Figure 1B:
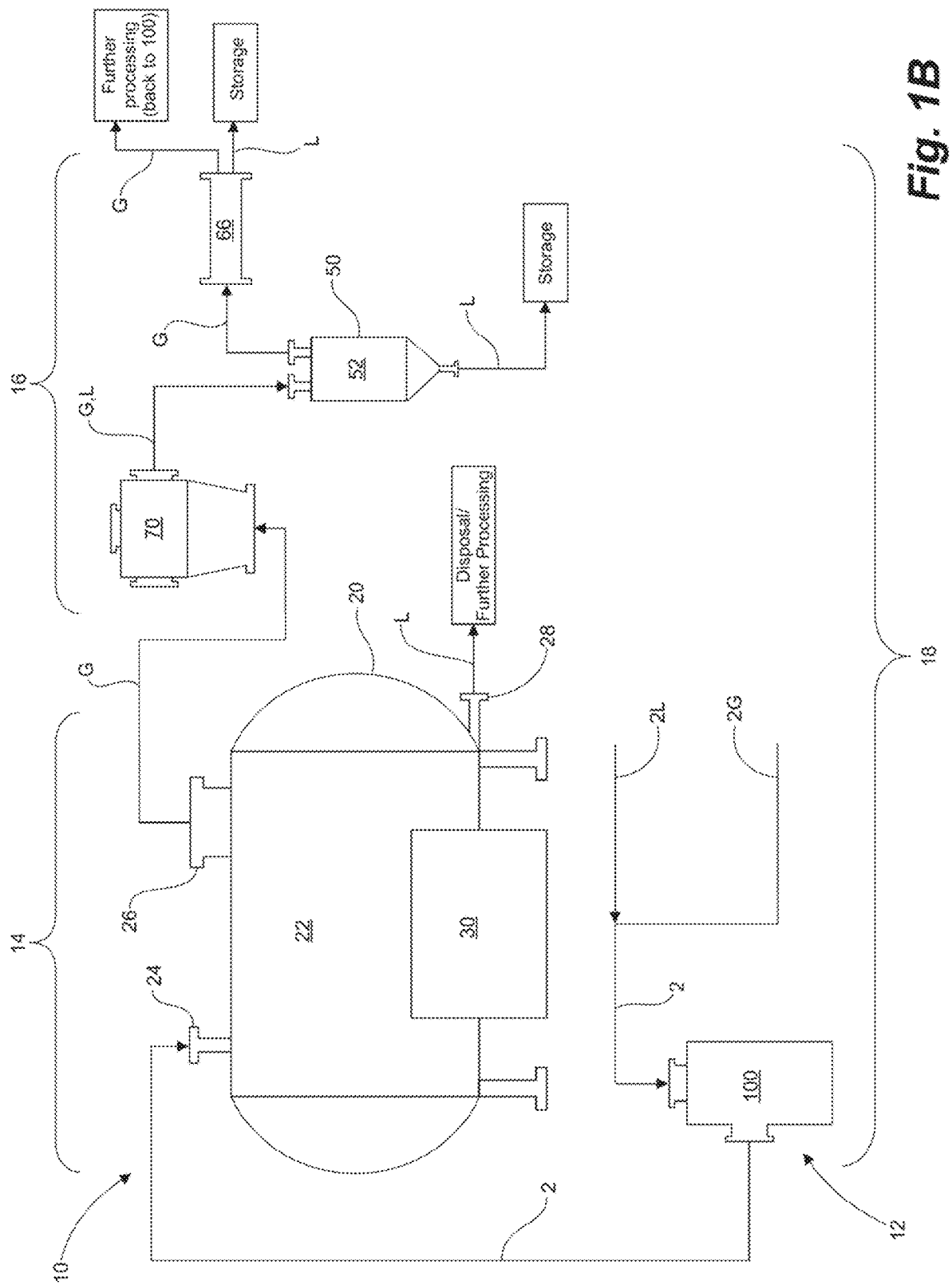
FIG. 1B is a schematic diagram of an alternative embodiment of a system for processing materials having a mixing stage, a decomposing stage, and a condensing stage.
Figure 1C:
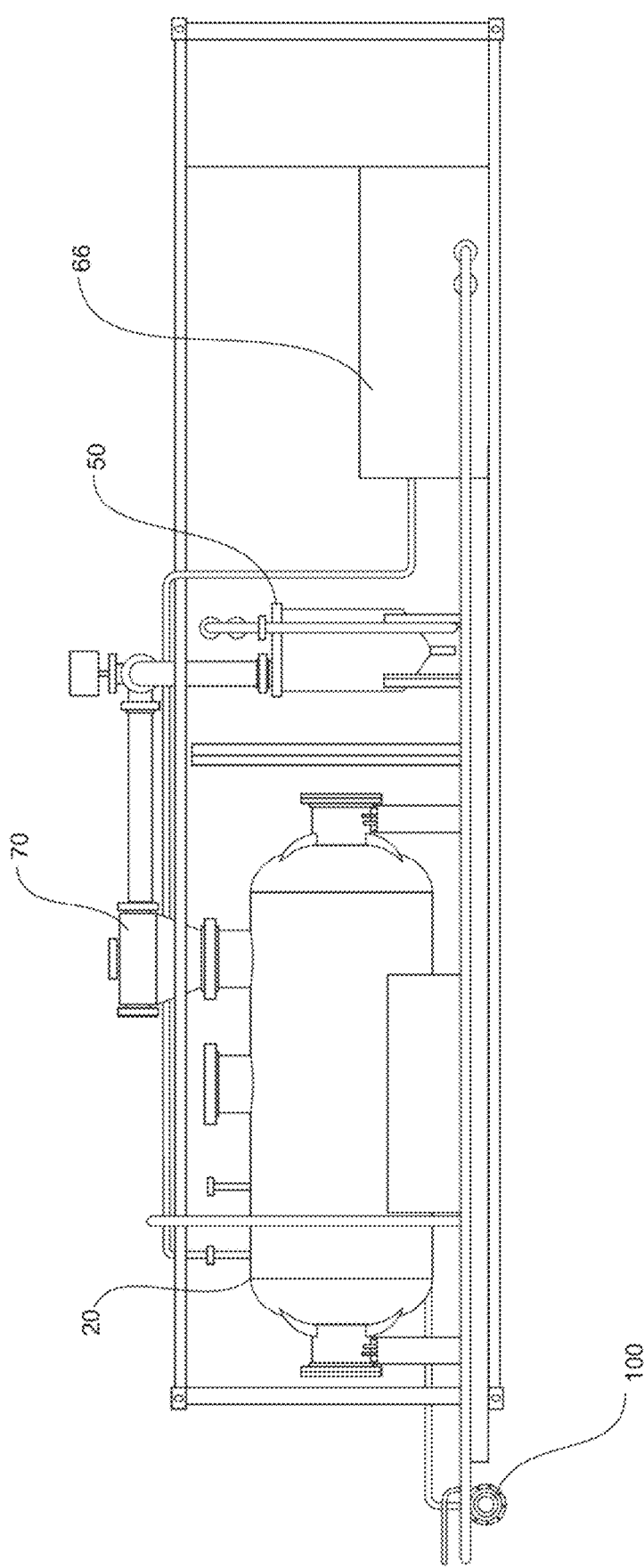
FIG. 1C is a side elevation view of an embodiment of a system for processing materials having a mixing stage, a decomposing stage, and a condensing stage.

With reference to FIGS. 1A-1C, the mixing stage 12, decomposing stage 14, and condensing stage 16 can comprise a single processing stage 18 of the system 10. In embodiments, the system 10 can comprise multiple processing stages 18a,18b, wherein the output of the decomposing stage 14 or condensing stage 16 of a first processing stage 18a can be directed to the mixing stage 12 and/or decomposing stage 14 of a subsequent processing stage 18b.

In embodiments, a processing stage 18 of the system 10 can comprise one or more of the mixing stage 12, decomposing stage 14, or condensing stage 16, or any part or combination thereof. For example, a processing stage 18 of the system 10 can comprise two or more flux tanks 20 connected to one another in parallel or in series.

As shown in FIG. 1C, the system 10 can be configured to be modular and portable. In the depicted embodiment, a single processing stage 18 of the system is configured to fit within a standard freight container or a skid for ease of transport and be deployed near sources of feedstock, such as hydrocarbon wells or waste disposal sites.

Decomposing Stage

With reference to FIGS. 1A-1C, the decomposing stage 14 comprises a flux tank 20 that receives feedstock 2 for decomposition by applying heat and vibration via an induced electromagnetic field F. The flux tank 20 can receive suitable feedstock 2 directly from a feedstock source, such as a hydrocarbon wellbore, storage tank, or from the mixing stage 12 of FIG. 1B, described in further detail below.

The flux tank 20 can comprise a substantially hollow body defining a flux chamber 22 therein, and having an inlet 24 for receiving feedstock 2, a gas outlet 26 through which gas products G from the decomposition of the feedstock 2 are directed, and a liquid outlet 28 through which liquid products L from the decomposition of the feedstock 2 may drain. A flux or a field generator 30 can be located adjacent the flux tank 20 and configured to generate an electromagnetic (EM) field F through the flux chamber 22. The EM field can be tuned to a resonant frequency of target atoms and/or molecules present in the feedstock 2. For example, the EM field can be tuned to a frequency in the range of 1 kHz-100 kHz, which Applicant has found is a suitable frequency range for exciting iron, a common component of hydrocarbon and other feedstock 2, as well as hydrogen and carbon. In embodiments, the frequency can further be tuned to avoid exciting undesirable materials, such as sulfur.

When an EM field as described above is applied, the vibrations of the target atoms become stronger. The intensity of the vibration of the target atoms can be increased by adjusting the field strength. The vibration of the target atoms can be increased to the point where the vibrational forces and heat generated therefrom cause the bonds of adjacent molecules of the feedstock 2 to break, thereby decomposing the feedstock 2 into condensable and non-condensable gas products G, liquid products L, char, and other residue. As one of skill in the art would understand, the feedstock 2 may also be heated by excitation of other atoms/molecules therein by the EM field, and by the heating of the flux tank 20 itself by eddy currents induced therein by the EM field.

The liquid products L created from the reaction in the flux chamber 20 can be drained or otherwise removed therefrom via the liquid outlet 28, for example located at a bottom portion of the flux chamber 22, and directed to storage for sale or disposal, or to another part of the system 10 for subsequent processing and refinement (for example to the mixing stage 12 of the present stage or another stage). In embodiments, the liquid products L can remain in the flux chamber 22 to be further decomposed along with a new feedstock 2. Gaseous products G created from the reaction in the flux chamber 22 are directed out through the gas outlet 26, for example located at a top portion of the flux chamber 22, to the condensing stage 16 downstream to be cooled and liquefied.

In alternative embodiments, other atoms or molecules besides iron can be targeted. For example, water molecules can be targeted instead, since water is present in many types of feedstock. The selected target atom/molecule should be present in sufficient quantities in feedstock such that the vibration of the target atoms/molecules, and heat generated therefrom, will break the bonds of the feedstock molecules.

Decomposition of the feedstock 2 using an induced EM field F is advantageous, as the reaction is more efficient relative to conventional methods of decomposing materials such as pyrolysis. The EM field can target the feedstock 2 directly such that less energy is used to heat the chamber itself or otherwise wasted. Additionally, as inducing vibration of target atoms utilizes mechanical forces as well as heat to break the bonds of the feedstock material, as opposed to using heat alone, a lower temperature is required to decompose the feedstock 2. For example, for a crude oil feedstock, heating to about 200° C. with the induced EM field method described above is sufficient to decompose the crude, as opposed to 500° C. for conventional methods only utilizing heat.

Further, as decomposition of feedstock 2 using an induced EM field does not need to take place in a substantially inert environment, as required by pyrolysis, the flux chamber 22 need not necessarily be sealed. Thus, in an embodiment, feedstock 2 can be continuously introduced into the flux chamber 22 while gaseous and liquid products are removed therefrom. In other embodiments, the feedstock 2 can be processed in batches in a sealed environment in the flux tank 20.

In an embodiment, with reference to FIGS. 2A-2E, the field generator 30 can comprise a conduit 32 configured to generate the EM field within the flux chamber 22. The conduit 32 can comprise a tubular non-ferromagnetic conduit, such as a PVC pipe having a plurality of conductive wires 34, such as copper wire, arranged circumferentially about the pipe in a helical fashion. An electrical current is supplied by an AC current source 42 through the conductive wires 34 to generate the EM field F. For example, the AC current source 42 can be configured to provide a 460V current through the wires 34 at the desired frequency range to generate the EM field F. A pump 36 is configured to circulate a coolant 38, such as air or a water/glycol mixture, through the conduit 32 to cool the conductive wire 34 surrounding the conduit 32. In embodiments in which a liquid coolant is circulated through the conduit 32, ferromagnetic particles 40 can be entrained in the coolant 38 and also circulated through the conduit 32. The circulation of ferromagnetic particles 40 amplifies the electrical current in the conductive wire 34.

Figure 2A:
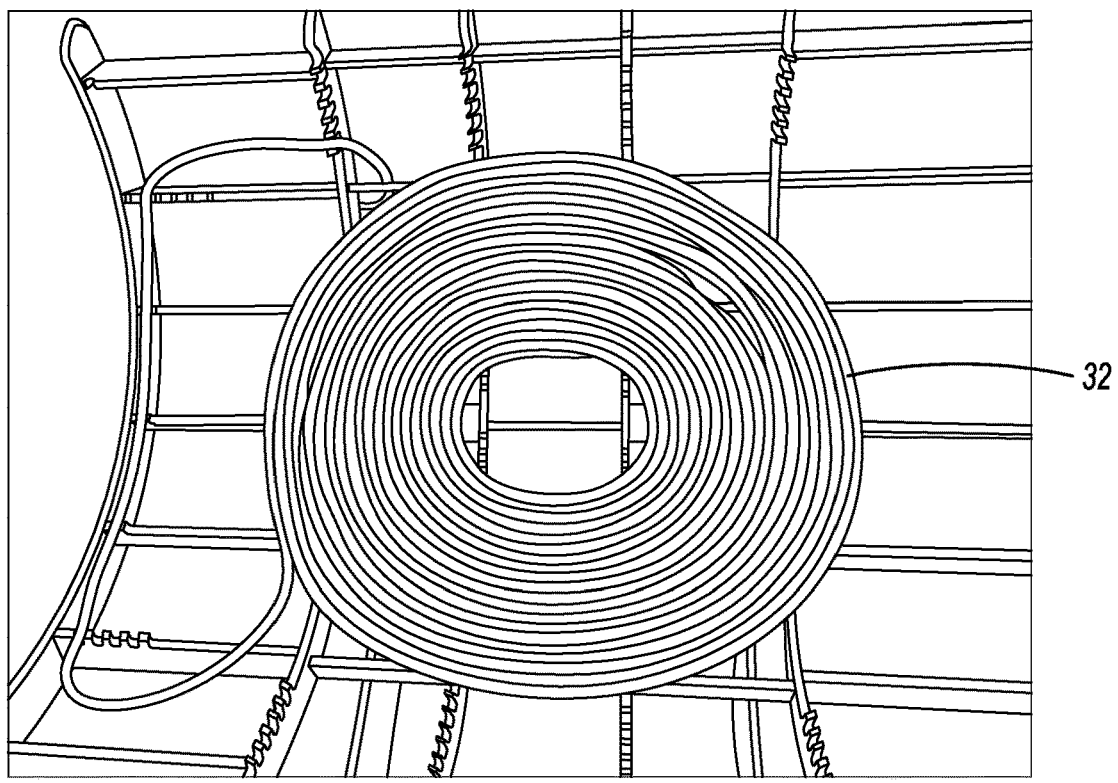
FIG. 2A is a perspective view of a conduit of a field generator configured in a circular saddle shape.
Figure 2B:
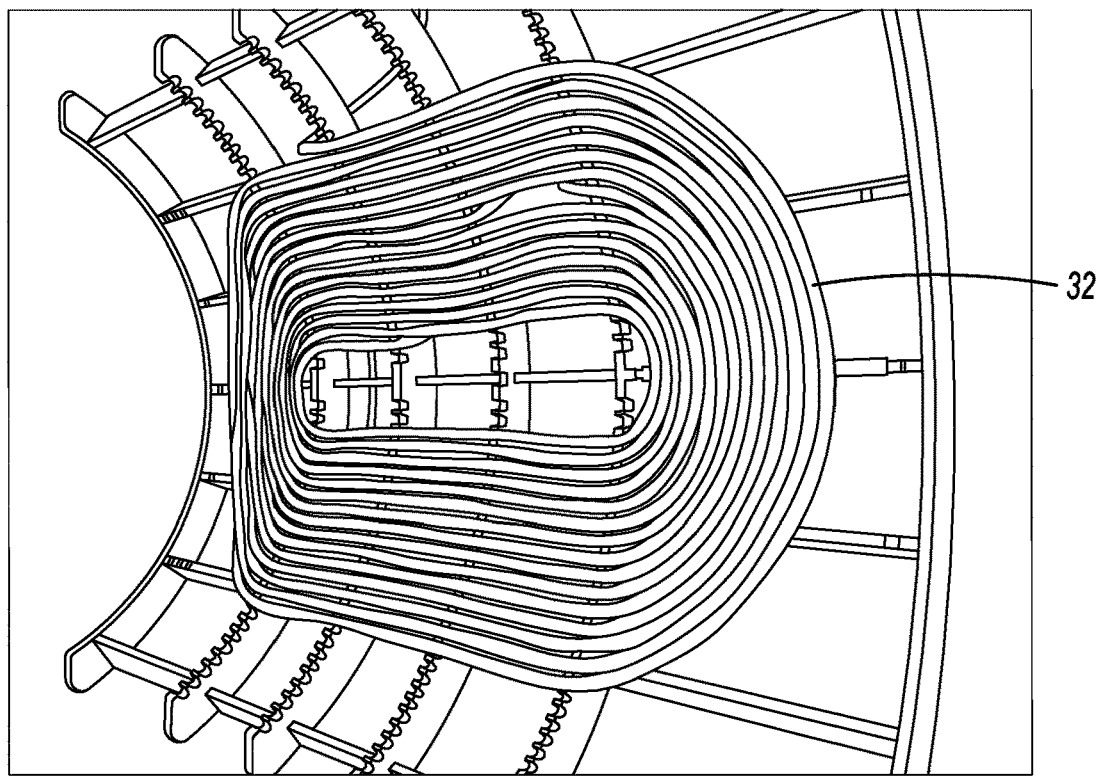
FIG. 2B is a perspective view of a conduit of a field generator configured in an elliptical saddle shape.
Figure 2C:
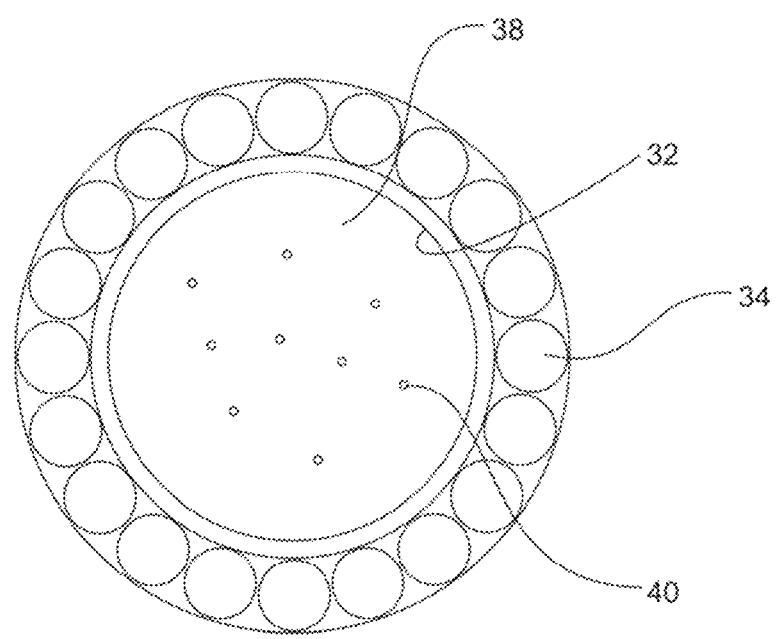
FIG. 2C is a cross-sectional front view of the conduit of the field generators of FIGS. 2B and 2C, having a pipe and a plurality of conductive wires located circumferentially therearound.
Figure 2D:
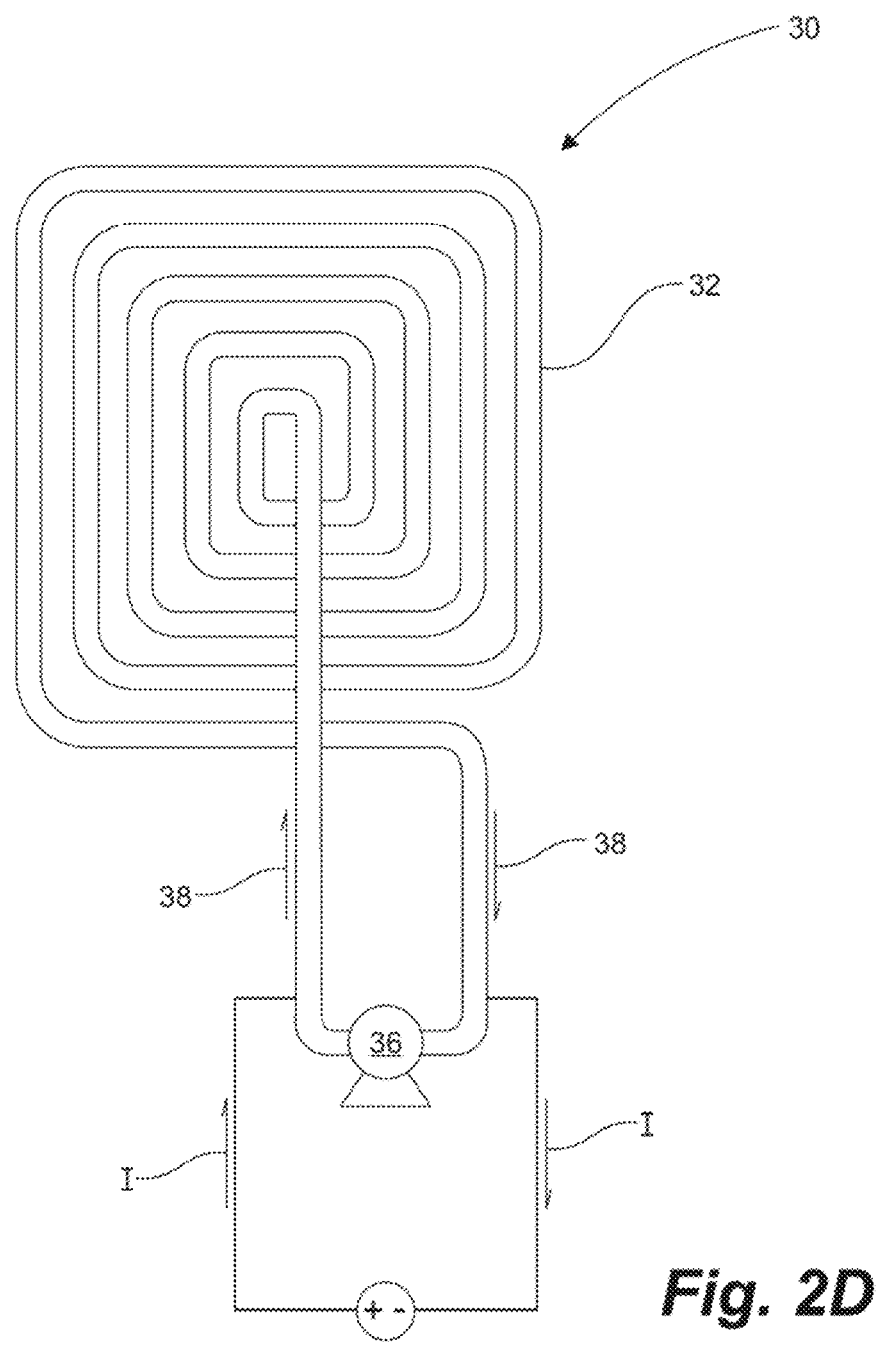
FIG. 2D is a top plan view of a field generator.
Figure 2E:
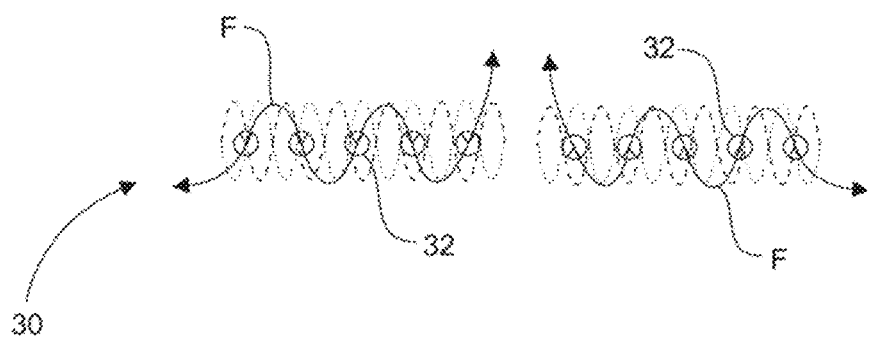
FIG. 2E is a side cross-sectional view of a field generator depicting the EM field lines by the field generator.

With reference to FIGS. 2A, 2B, and 2D, the conduit 32 can be configured in a coil, and be generally saddle-shaped to follow the curvature of the flux tank 20. Configuring the conduit in a saddle shape also creates an EM field shape within the flux tank 20 that is conducive to decomposing the feedstock 2 therein. Specifically a saddle shaped conduit 32 generates a generally spherical or ellipsoid EM field. As a person of skill in the art would understand, the conduit 32 can be configured in a variety of shapes to produce various EM field shapes as desired to adapt to the design of the flux tank 20.

The frequency and strength of the EM field F created by the field generator 30 can be manipulated by adjusting the spacing of the conduit 32, the number of conduit loops, the pitch of the windings of the conductive wires 34, the amount of conductive wire 34, the amount of ferromagnetic particles 40 in the coolant 38, the flow rate of the coolant 38, and the amount of incoming electrical current from the field current source 42.

Condensing Stage

Figure 3:
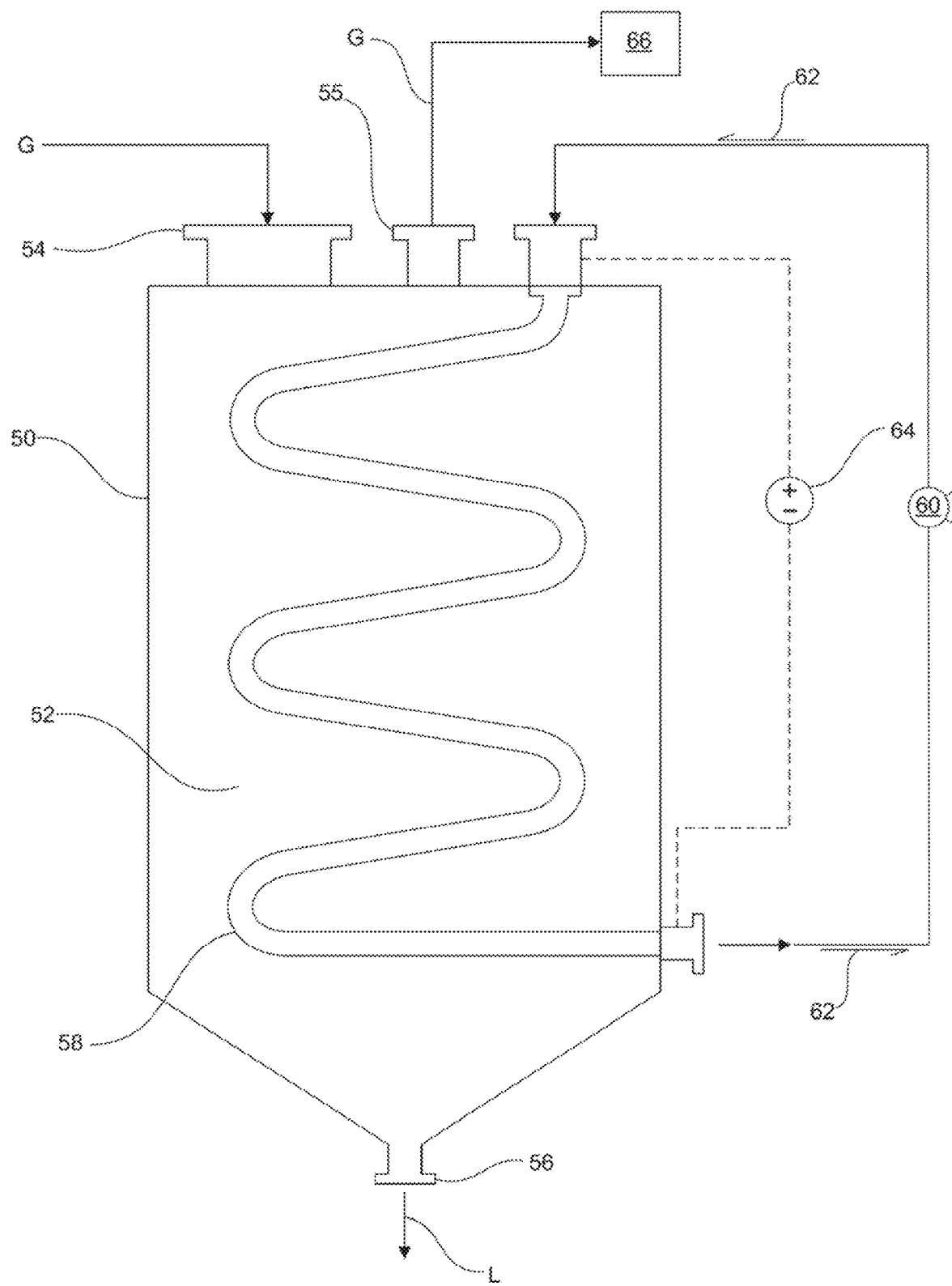
FIG. 3 is a cross-sectional side elevation view of a distillation tank of a condensing stage of a system for processing materials.

With reference to FIGS. 1A, 1B, and 3, the gaseous products G created from the reaction in the flux tank 20 proceed from a gas outlet 28 of the flux tank 20 to one or more distillation tanks 50 for cooling and condensation thereof. Each of the distillation tanks 50 have a distillation chamber 52, an inlet 54 for receiving gas products G from the decomposing stage 14, a gas outlet 55 for directing non-condensible gases G, and an outlet 56 for the removal of condensed liquids L from the chamber 52. Further, the distillation tanks 50 each have a cooling coil 58 located inside of the tank connected to a distillation pump 60 configured to circulate coolant 62 from a coolant source through the cooling coil 58. Gaseous products G enter the distillation chamber 52 from the inlet 54 located near an upper end of the distillation tank 50, a first portion of which condense into a condensate L as they are cooled by the cooling coil 58. The condensate L proceeds towards the outlet 56 located near a bottom end of the distillation chamber 52, and can be directed to storage for sale or disposal, or to another downstream part of the system 10 for subsequent processing and refinement.

An example of subsequent processing includes directing the condensate L to the mixing stage 12 of the present stage or another subsequent stage).

In some embodiments, the cooling coil 58 can be made of an electrically conductive material, such as copper, and connected to a distillation current source 64 to pass an electrical current through the cooling coil 58 to generate a second EM field. The second EM field attracts the ionized gas entering into the distillation tank 50 and provides a greater condensation rate. For example, the current source 64 can be a 12V AC power source configured to generate the desired current for the second EM field. Applicant has found that passing a current through the cooling coil increases the recovery rate of the distillation tanks.

Figure 8A:
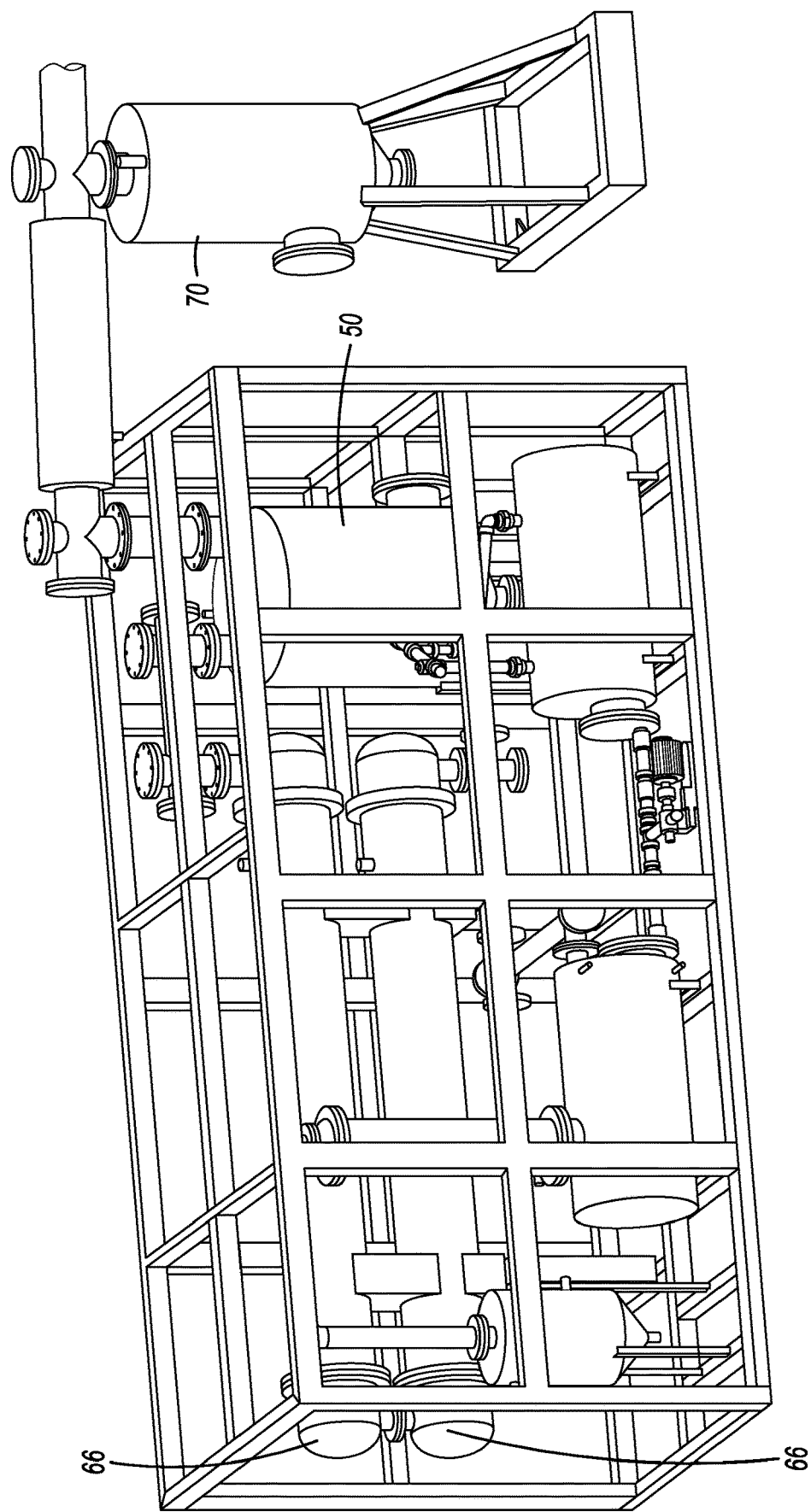
FIG. 8A is a perspective view of an embodiment of the condensing stage of the materials processing system.
Figure 8B:
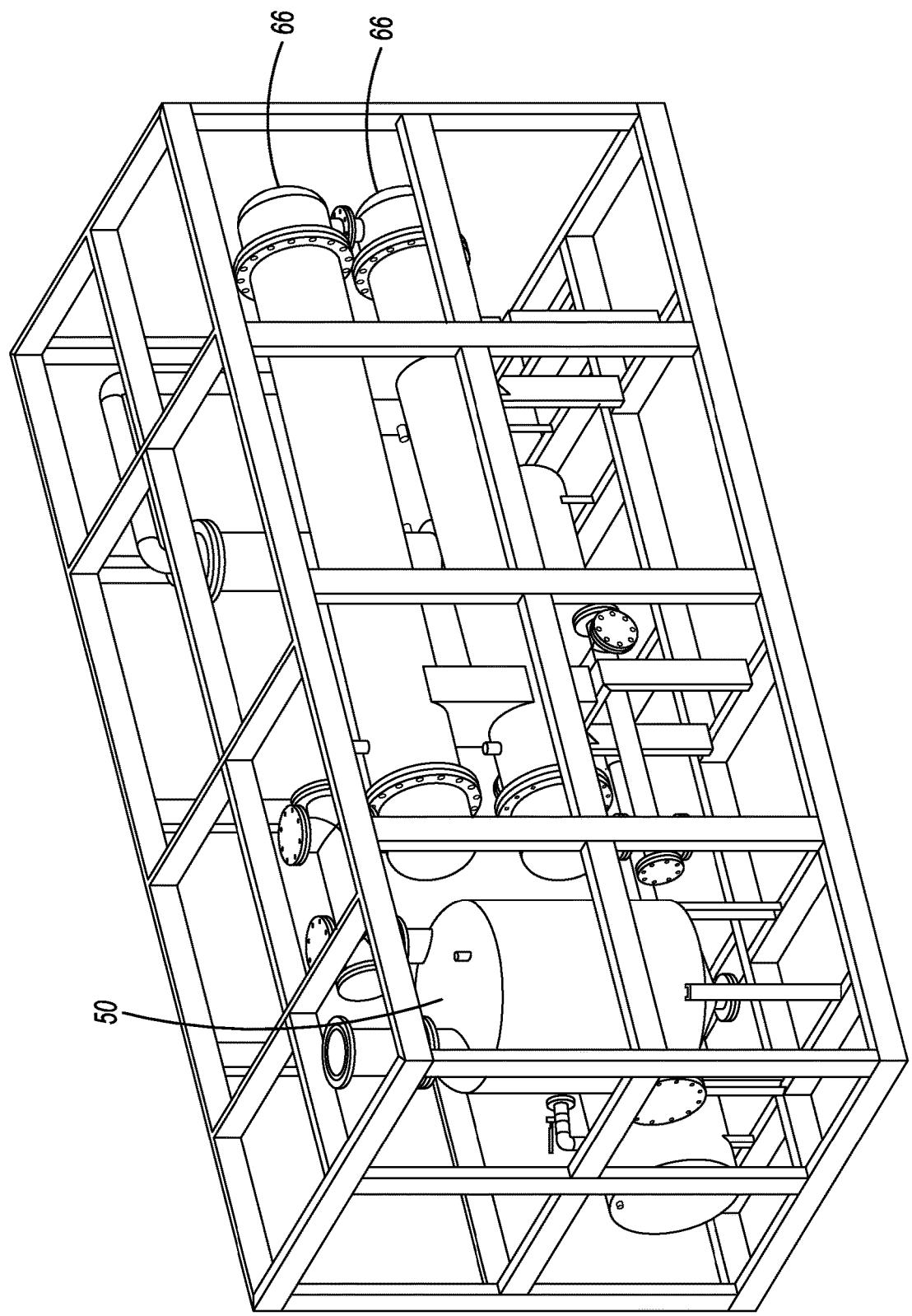
FIG. 8B is a perspective view of the condensing stage of FIG. 8A from another angle.

For example, in an embodiment wherein the distillation current source 64 is a 12V AC power source, the recovery rate of the distillation tank has been shown to improve by about 10%. With reference to FIGS. 8A and 8B, gases G that have not condensed in the distillation tanks 50 can be directed out of the tanks 50 through the gas outlet 55 to one or more condensing pipes 66 located in a condensing tank 68 to provide a further condensing step for the gases. The condensing pipes 66 each comprise a ceramic filter stack which act to cool and condense the gases passing through the pipes 66. In embodiments, an electrical current can be passed through the electrically conductive condensing pipes 66 or tank 68 to create a third EM field to assist with the condensing of gases G. Condensate L from the condensing pipes 66 can be directed to storage for sale or disposal, or to another part of the system 10 for subsequent processing and refinement.

Any gases G not yet condensed after passing through the condensing pipes 66 can be mixed with feedstock 2 entering the present processing stage 18, or another stage, to undergo further processing.

In embodiments, with reference to FIGS. 4A-4F the condensing stage 16 can further comprise a catalyst tank 70 located upstream of the distillation tanks 50 for providing an initial condensing step for the gaseous products G from the flux tank 20. The catalyst tank 70 is communication with the gas outlet 26 of the flux chamber 22 and comprises an inlet 72 for receiving gas products G from the flux chamber 22, and an outlet 74 for gas G and condensate L to be directed to the distillation tanks 50 downstream.

With reference to FIGS. 4C-4E, the catalyst tank 70 further comprises a catalyst accumulator element 76 positioned above the inlet 72. In the depicted embodiment, the accumulator element 76 is a generally cylindrical member resting on a retaining plate 88. The accumulator element 76 comprises a lattice forming a plurality of channels 78 formed therethrough, creating a plurality of walls 80 arranged generally in a grid pattern. In a preferred embodiment, the channels 78 are oriented generally towards the inlet 72. The exposed surfaces of the accumulator element 76 are made of a material that will not react with the gaseous products G from the flux chamber 2, such as ceramic or another suitable material. While only one accumulator element 76 is shown in the depicted embodiment, multiple elements 76 can be located in the catalyst tank 70. In alternative embodiments, the accumulator element 76 can be suspended in the catalyst tank 70, for example by a scaffolding extending from an upper end of the catalyst tank 70 configured to hold the accumulator element 76 above the retaining plate 88 and defining ports above the element 76 for non-condensed gas G to flow therethrough. In embodiments, the accumulator element 76 is oriented generally vertically.

As best shown in FIG. 4E a catalyst material 82, for attracting the gaseous products G from the flux tank 22, is embedded within the walls 80 of the accumulator element 76, such that the catalyst material 82 is not exposed to the product gases G. As the gases exit the flux chamber 22 and the EM field, they become positively charged and are attracted to the catalyst material 82 embedded within the walls 80 of the accumulator element 76. As the gases G contact the walls 80 of the element 76, they are cooled and condense thereon. As condensation tends to be greater towards the top of the accumulator element 76, the catalyst channels 78 become increasingly obstructed by condensate L towards the top upper end of the accumulator element 76, thus slowing down the passage of gases G and creating higher compression, and causing additional gas to condense. The gaseous products G from the flux chamber 22 are thereby condensed in the catalyst tank 70 by the attraction of the gases to the catalyst material 82 within the walls 80 of the accumulator element 76, and not to the reaction of the gases G directly with the catalyst material 82.

Figure 4A:
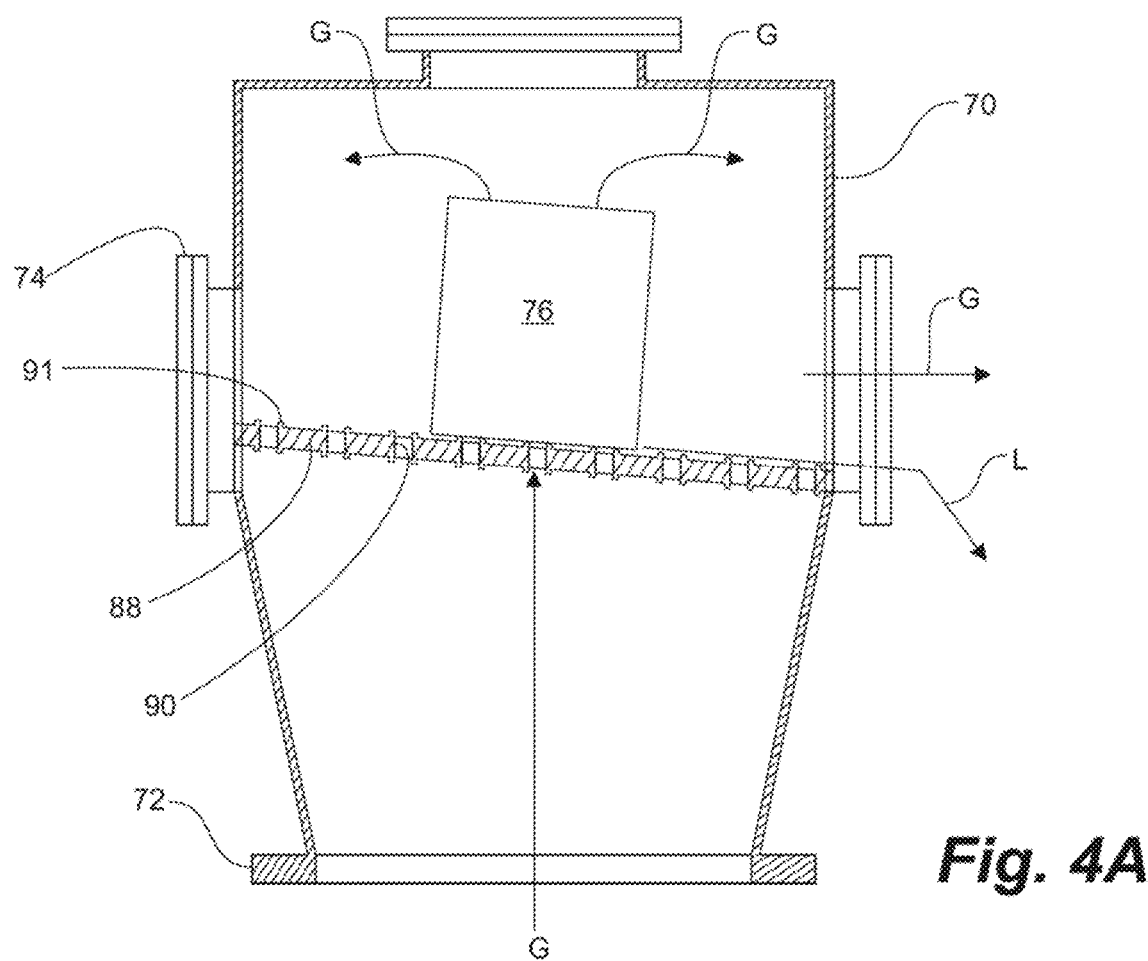
FIG. 4A is a cross-sectional side elevation view of a catalyst tank of a condensing stage of a system for processing materials.
Figure 4B:
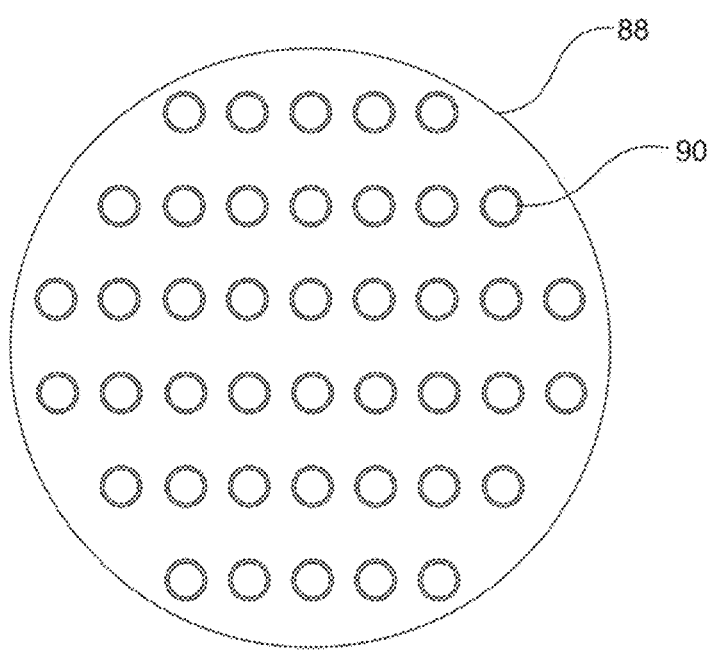
FIG. 4B is a top plan view of the retaining device of the catalyst tank of FIG. 4A.
Figure 4F:
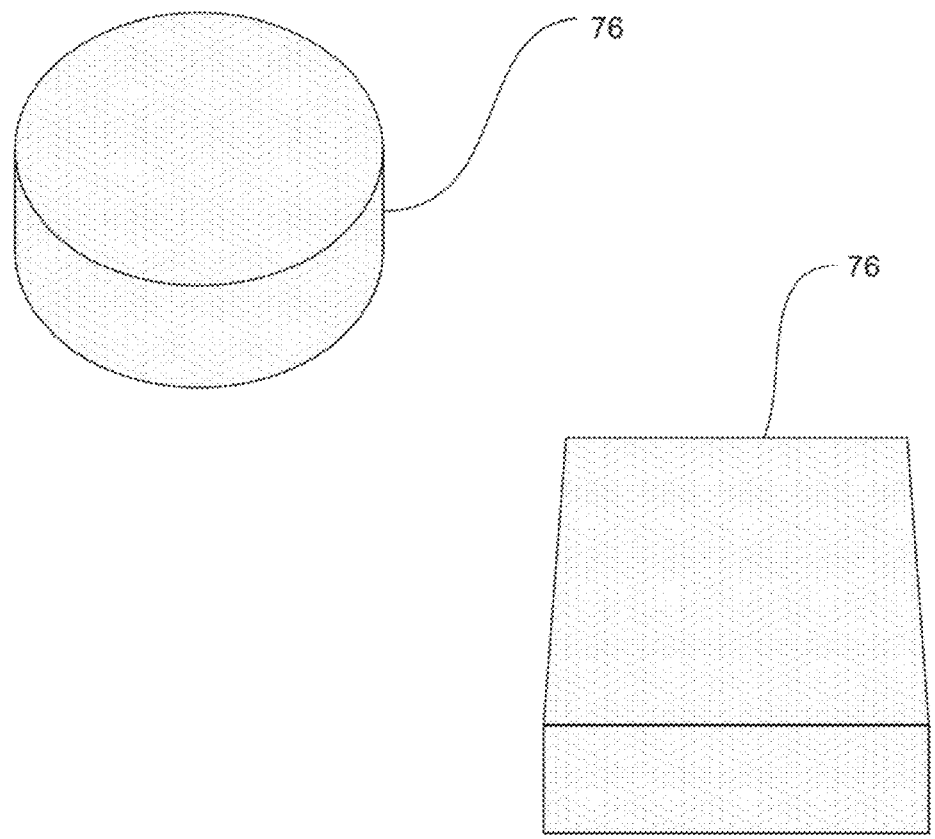
FIG. 4F is an alternative embodiment of an accumulator element, wherein the element is a ceramic foam.

In alternative embodiments, with reference to FIG. 4F, the accumulator element 76 can be a generally cylindrical ceramic foam element comprising a ceramic lattice forming a plurality of channels 78 for receiving and condensing gas products. As above, the ceramic lattice has a catalyst material 82 embedded therein for attracting the gas products to the matrix without contacting and reacting therewith.

The liquid condensate L falls from the accumulator element 76 and is retained within the catalyst tank 70 by a retaining device 88 located below the accumulator element 76. The retaining device 88 is configured to permit gases G to pass therethrough to reach the accumulator element 76, but generally prevent liquid condensate L falling back into the flux tank 20. The retaining device 88 can further be configured, e.g. inclined, to guide the flow of condensate L from the accumulator element 76 towards the outlet 74 of the catalyst tank 70. For example, the retaining device 88 can be a retaining plate or tray having a plurality of openings 90 sized to permit the gaseous product G from the flux tank 20 to pass upwards therethrough to the accumulator element 76, but prevent the condensed liquid L from falling back into the flux tank. The retaining plate 88 can further be inclined to direct the condensed liquid L falling thereon to the distillation tanks 50 the outlet 74. In embodiments, each of the openings 90 have a generally upwardly extending circumferential lip 91 therearound for preventing liquid condensate L from falling through the openings 90. Additionally, the openings 90 can each have a cover thereover for preventing condensate L from falling back down therethrough.

The use of a catalyst material 82 embedded within the walls 80 of the accumulator element 76 is advantageous, as the attraction of the gases G towards the walls of the accumulator element 76 facilitates the condensation of the gases exiting the flux chamber 22 without consuming the catalyst material 82. As a result, the catalyst material 82 does not need to be replaced, and the condensed liquid L is not waxy and does not require treatment to remove undesirable products of the catalyzed reaction.

Further, Applicant has found that pre-treatment of the gaseous products G in the catalyst tank 70, along with locating the cooling coils 58 inside of the distillation tanks 50, results in significantly increased condensation rates. For example, in one embodiment wherein the system 2 was used to process plastic feedstock to produce diesel and gasoline, the system achieved a 94% condensation rate compared to about a 70% condensation rate of prior art distillation tanks. Such improved condensation rate is due to the fact that the catalyst material 82 of the present invention does not come in contact with the gases G or liquids L from the flux tank 20. As such, the catalyst material 82 attracts the gases to the walls 80 of the accumulator element 76, but does not bond therewith. Further, using the catalyst tank 70 to condense gases G prior to the distillation tanks 50 enables the distillation tanks 50 to be operated at relatively low pressure, for example between about 20-450 psi compared to up to 1000 psi for conventional distillation systems, while still achieving improved condensation rates.

Manufacture of Catalyst Element

The accumulator element 76 can be manufactured by mixing a selected catalyst material 82 with a matrix material, such as ceramic clay, to form a catalyst mixture with the catalyst material 82 suspended in the matrix material. The catalyst mixture can then be extruded into the desired shape to form the accumulator element 76, for example in a generally cylindrical shape having a plurality of channels extending therethrough, as shown in FIG. 4C. For embodiments wherein the accumulator element 76 is a ceramic foam, open-cell polymer foams can be impregnated with the catalyst mixture to form the ceramic lattice of the element 76.

The accumulator element 76 can then be fired using a kiln or other suitable method to set the element. For example, the accumulator element 76 can undergo multiple firing processes, each process involving firing the accumulator element 76 at 1800° F. to 2400° F. for 12 hours. After the accumulator element 76 has been fired, it can be submerged in an acid bath to dissolve the catalyst material 82 off of the outer surfaces of the accumulator element, such that catalyst material 82 only remains embedded within the matrix material. The acid used in the acid bath can be hydrochloric acid or any other corresponding acid suitable for removing the catalyst material 82 from the outer surfaces of the accumulator element 76.

Suitable catalyst materials, to be used in the manufacture of the accumulator element 76, can comprise a catalyst selected from the group consisting of Acidic catalysts, Silica-Alumina, PZMSM-5 Zeolite, HZSM-5 zeolite, Hy Zeolite, Mordenite ZSM-5 x-Zeolite, Faujasite Zeolite (y-Zeolite), Clinoptilolite, MCM-41, and SBA-15, ZnO, CaO, K2O, and combinations thereof.

Reformer (Mixing Stage)

As introduced above, in some embodiments, a mixing stage 12 can be located upstream of the decomposing stage 14 and comprise mixing equipment for combining gaseous and liquid portions of the feedstock 2G,2L into a combined liquid feedstock 2 to be delivered to the flux tank 20. The gaseous and/or liquid feedstock portions 2G,2L can be obtained from a feedstock source, feedstock reserve, or from another part of the system 10, for example recirculated from the condensing stage 16 or another preceding processing stage 18.

Figure 5A:
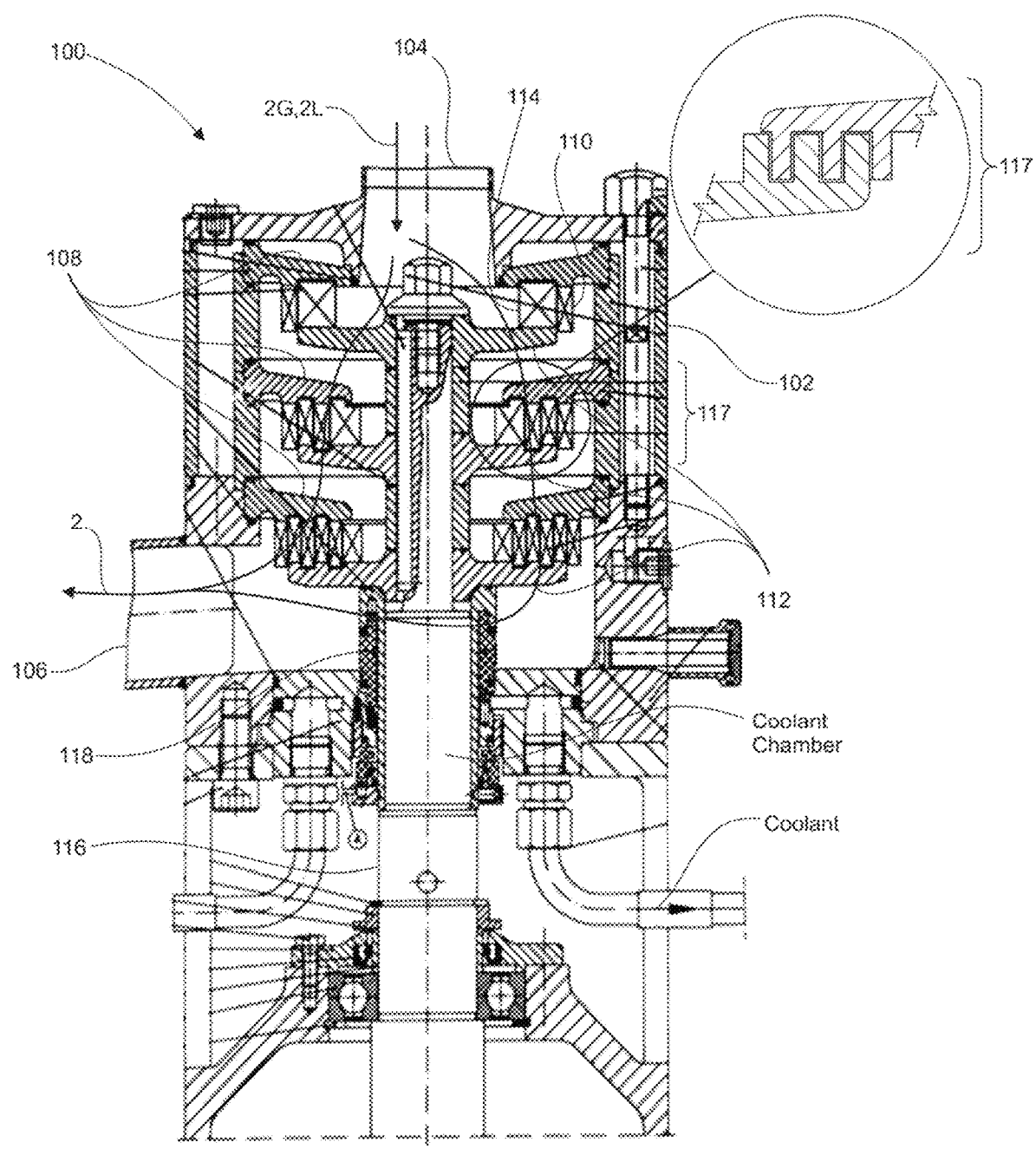
FIG. 5A is a side cross-sectional view of a reformer of a mixing stage of an embodiment of a system for processing materials.

With reference to FIGS. 1B and 5A, in an exemplary embodiment, the mixing stage 12 comprises a hydrodynamic cavitation reformer device 100 that receives and combines gaseous and liquid feedstock portions 2G,2L using heat, pressure, and mechanical processes to produce the combined liquid feedstock 2. For example, the reformer 100 can be used to combine C1 through C12 hydrocarbon gases with a like liquid, e.g. any of the liquid hydrocarbons, to produce a combined liquid feedstock 2. Unlike prior art refining systems, which require the input of water to provide hydrogen molecules as a reactant for liquefaction, the reformer 100 does not require water to produce a combined liquid feedstock 2.

As best shown in FIG. 5A, the reformer 100 comprises a housing 102 having a reformer inlet 104 and reformer outlet 106 in communication with a reformer chamber 103. As shown in FIG. 5B, the chamber 103 contains one or more mixing stages, each stage comprising a pair of plates 108, 112

Each pair of plates 108,112 comprises a stationary plate 108 and a rotating plate 112. The stationary plate 108 comprises a first plurality of teeth 110 arranged in at least a first circumferential array. Two or more circumferential arrays can be arranged in concentrically-spaced annular rings. The teeth 110 extend axially from the stationary plates 108 in a first direction, substantially perpendicular from the plate 108. The first teeth 110 are spaced circumferentially from one another so as to form a plurality of first radial flow passages therebetween. The rotating plates 112 comprises at least one annular ring, each having a second plurality of teeth 114 extending axially in a second direction, opposite the first direction and substantially perpendicular from the rotating plate 112. The second teeth 114 are also spaced circumferentially from one another so as to form a plurality of second radial flow passages therebetween.

The one or more annular rings of the second teeth 114 are offset radially from the one or more annular rings of the first teeth 110. The plates 108,112 can be axially engaged so as to permit axial and radial intermeshing between corresponding teeth of the first plurality of teeth 110 and the teeth of the second plurality of teeth 114.

The stationary plates 108 can be fixedly secured to the housing 102 or otherwise configured to be non-rotatable during operation of the reformer 100. The rotating plates 112 are operatively connected to a driveshaft 116, which is in turn connected to a driving means (not shown) configured to rotate the driveshaft 116. For example, the driving means can be a motor configured to rotate a drive belt connected to the drive shaft 116.

Each of the one or more rotating plates 112 correspond with at least one of the one or more stationary plates 108, such that the rings of second teeth 114 of the rotating plates 112 are radially spaced from the rings of first teeth 110 to intermesh radially with the stationary plate 108 corresponding therewith. Such radial spacing of the rings of teeth 110,114 of corresponding plates 108,112 permit the rotating plates 112 to rotate relative to their corresponding stationary plates 108 when the reformer 100 is assembled. When assembled, each stage or pair of the rotating plates 112 are coupled to their corresponding stationary plates 108 such that the first and second pluralities of teeth 110,114 of corresponding plates mesh axially and radially to occupy a common axial segment 117 of the reformer housing 102, due to the radial spacing of the corresponding first and second pluralities of teeth 110,114. The mixed feedstock of each plate stage flows to the subsequent stage until reaching the outlet 106.

The first and second pluralities of teeth 110,114 of corresponding stationary and rotating plates 108,112 are closely spaced radially such that, when the rotating plates 112 are rotated relative to the stationary plates 108, the motion of the second teeth 114 of the rotating plates 112 relative to the first teeth 110 of the stationary plates 108 create a shearing force therebetween. For example, the clearance between radially adjacent teeth of the first and second pluralities of teeth 110,114 can be about 200 µm to about 1500 µm apart.

Pairs of plates 108,112 can be located in the reformer chamber 103, each pair spaced axially between the inlet 104 and outlet 106. The stationary plates 108 can be sealed with the inner walls of the reformer chamber 103 such that the only flow path to the outlet 106 for incoming liquid and gaseous feedstock portions 2L,2G is to pass through the flow passages formed between the first and second pluralities of teeth 110,114 as the rotating plates 112 rotate and the first and second radial flow passages temporarily align. The shearing force applied by the teeth 110,114 as the liquid feedstock portion 2L flows therebetween creates cavitation air bubbles in the feedstock portion 2L which rapidly collapse/implode shortly after forming, creating instantaneous heat of up to 2000° F. This heat promotes the combination of the gaseous and liquid feedstock portions 2G,2L. Further, the cavitation of the liquid feedstock portion 2L exposes a greater surface area of the liquid portion 2L to the gaseous portion 2G. Thus, the hydrodynamic cavitation effect created by the rotating plates 108 assists in combining the liquid and gaseous portions 2L,2G of the feedstock into a combined liquid feedstock 2.

In embodiments, the first and second pluralities of teeth 110,114 can be shaped to direct the feedstock portions 2L,2G towards the outlet 106. As shown in FIG. 5A, the first and second pluralities of teeth 110,114 are shaped to direct the feedstock portions 2L,2G radially outwards such that the feedstock portions 2L,2G work their way through the interstitial spaces between the first and second teeth 110,114 and undergo cavitation from the shearing forces therebetween.

In an embodiment, the driveshaft axis is generally vertical and the reformer inlet 104 is at a top of the driveshaft 116. The flow path is formed from the inlet 104 to a first mixing stage, namely the first pair 108,112 of plates. The liquid and gas feedstock portions 2L,2G reach the rotating plate 112 of the first stage and travels radially through the second radial flow passages and into the radial spacing between the radially inward array of teeth 114 and into the radial spacing therebetween the plurality of first teeth 114 and the plurality of second teeth and are subjected to the mixing and shearing force. The mixed feedstock 2 continues through the first passageways of the first array of teeth 110.

Each stage of pairs of stationary and rotating plates can be fit with additional annular rings of intermeshed pluralities of teeth 110,114 for repeated shearing and mixing. The reformer 100 can be fit with multiple stages, and each stage can comprises a greater number of annular rings of intermeshed teeth 110,114

The combination of the liquid and gaseous portions 2L,2G into a combined feedstock 2 can operate continuously, such that gaseous/liquid portions 2G,2L can constantly be fed into the reformer 100 as combined liquid feedstock 2 exits. Cavitation of the feedstock mixture within the reformer 100 can cause accelerated wear on the reformer plates 108,112. Therefore, the plates 108,112 are preferably made of a hardened or otherwise wear-resistant material that can withstand prolonged operation. Examples of suitable materials for the plates of the reformer include, but are not limited to, titanium, chromium, and tungsten carbide.

In embodiments, the stationary and/or rotating plates 108,112 can also be made at least partially of a magnetic material, such as neodymium. The magnetic field generated by the rotating plates 108, as well as the combining of the feedstock portions 2G,2L via cavitation, negatively ionizes the feedstock 2 within the reformer 100. Such negative ionization prepares the feedstock 2 for subsequent steps in the process by increasing the electrical attraction of the feedstock 2 as it proceeds through the decomposing stage 14 and condensing stage 16. Such ionization stabilizes the feedstock 2 and prepares it to be liquefied in subsequent steps. For example, the ionized feedstock 2 is more readily attracted to the walls 80 of the accumulator element 76 of the catalyst tank 70.

The operation of the reformer 100 can generate a significant amount of heat, and also create pressure fluctuations within the reformer chamber 103. A coolant, such as a mixture of water and glycol, can be circulated through the reformer 100, such as through a cooling chamber located within the reformer chamber 103, to cool the reformer 100. A double-walled bladder can separate the reformer chamber 103 from the cooling chamber to prevent mixing of the coolant in the cooling chamber and the gaseous and liquid feedstock portions 2G,2L in the reformer chamber 103. Further, to accommodate for pressure fluctuations within the reformer chamber 103, the reformer chamber 103 can be placed in communication with a bladder chamber 118 configured to mitigate pressure fluctuations in the chamber 103.

Gaseous Feedstock

Gaseous feedstock, such as C1-C12 hydrocarbon feedstock, can be processed using the present system by first feeding the feedstock to the reformer. The gaseous feedstock can be combined with a like liquid, i.e. any of the liquid hydrocarbons, to produce a liquid feedstock, after which the combined liquid feedstock can be processed in a similar manner as above.

Solid Feedstock

Figure 7A:
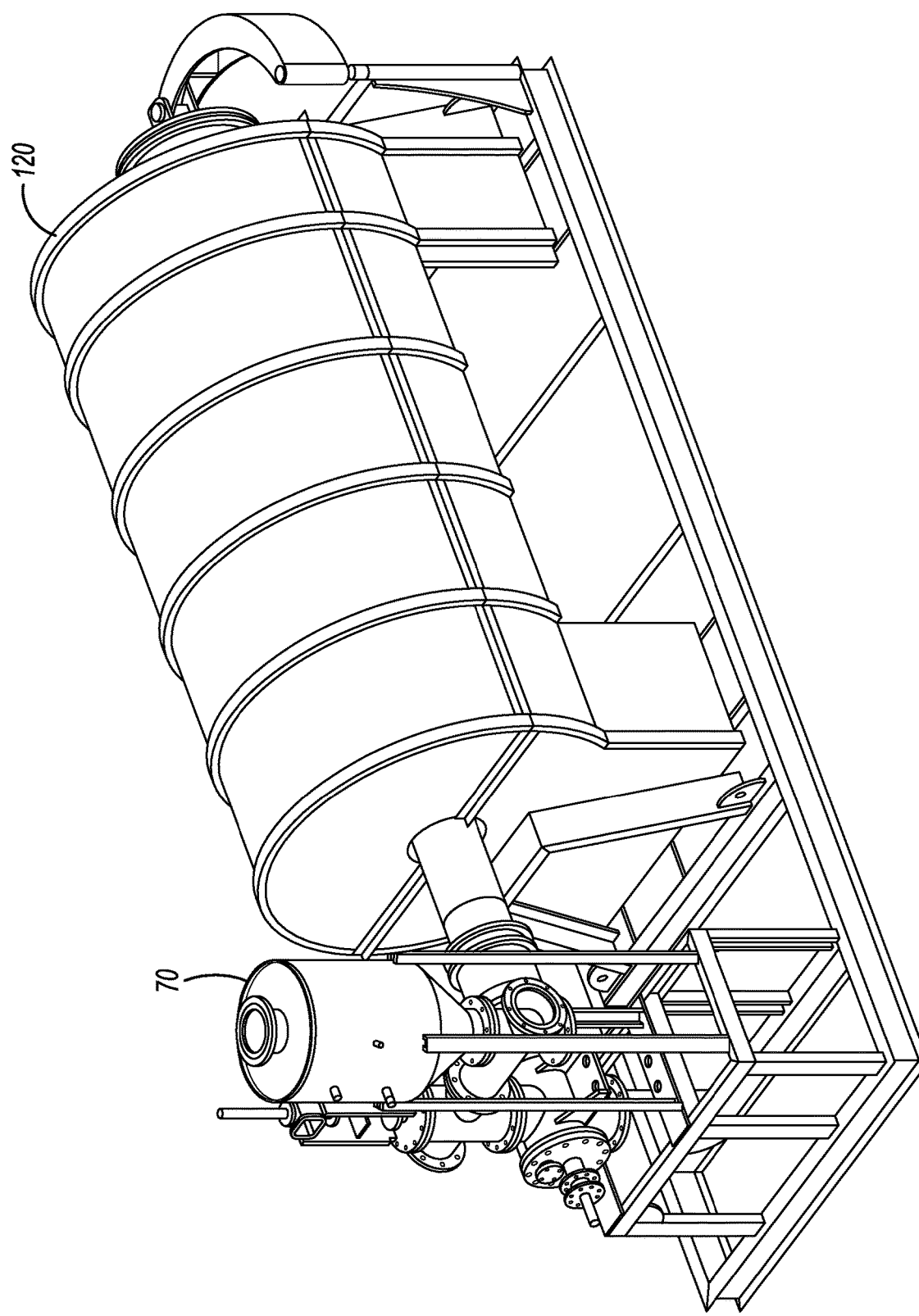
FIG. 7A is a perspective view of a depolymerization tank of an embodiment of a system for processing materials.
Figure 7B:
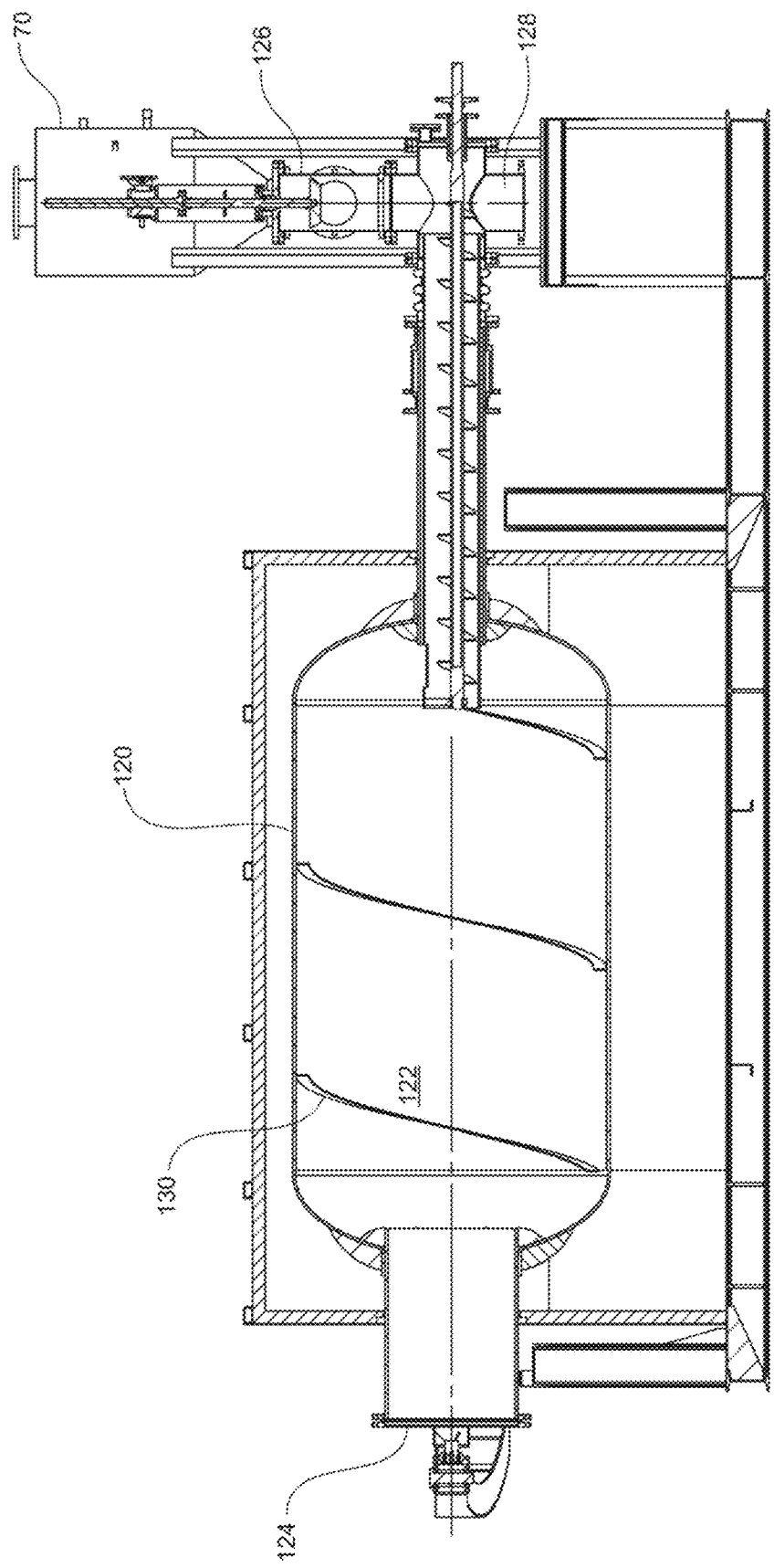
FIG. 7B is a cross-sectional side elevation view of the depolymerization tank of FIG. 7A.

With reference to FIGS. 7A-7B, the present system 10 can be configured to process solid feedstock 2S, such as plastics and the like, by adding a depolymerization tank 120 upstream of the decomposing section 14 (FIG. 1A) and mixing section 12 (FIG. 1B) if present. The depolymerization tank 120 is configured to break down solid feedstock 2S into liquid and gaseous products, and vaporize said liquid products into gaseous products. The depolymerization tank 120 comprises a substantially hollow body defining a depolymerization chamber 122 therein, and having an inlet 124 at a first end 123 for receiving solid feedstock 2S, a gas outlet 126, from a second end 125, through which gas products from the depolymerization of the solid feedstock 2S are directed, and a solids outlet 128 through which solid residue produced from the depolymerization of the feedstock 2 is directed. A field generator 30 similar to that used with the flux tank 20 is located adjacent the depolymerization tank 120 and configured to generate an EM field through the depolymerization chamber 22. In embodiments, a catalyst tank 70 can be located downstream of the gas outlet 126 to condense the gas products from the polymerization tank 120 to a liquid product prior to further processing.

The depolymerization tank 120 can also be configured to rotate to create an active rotating or fluidized bed which agitates the solid feedstock 2S and promotes depolymerization thereof. For example, as shown in FIGS. 7A and 7B, the depolymerization tank 120 can be rotatably mounted on a frame 132, located within an insulated housing 133, and operatively connected to a driving means (not shown) configured to rotate the tank 120. The EM field created by the field generator 30 breaks the solid feedstock 2S or at least the depolymerizable portion thereof, down in the same manner as the flux tank 20 decomposes feedstock, producing unrefined liquid and gaseous products that can serve as liquid and gaseous feedstock portions 2L,2G, and solid residue such as carbon black. The liquid products can be further depolymerized in the tank 120 such that only gaseous product and solid residue remain. The solid residue can be removed from the depolymerization chamber 122 and disposed of, and the gaseous and liquid products can be directed to the mixing stage 12 of the processing system 10 to be processed in the manner as described above.

In embodiments, the interior wall of the second end 125 of the depolymerization tank 120 can have helical flights 130 extending radially inwardly therealong. The flights 130 assist with initially receiving solid feedstock 2S into the depolymerization chamber 122, and subsequently removing solid residue therefrom. More particularly, solid feedstock 2S can be introduced into the depolymerization chamber 122 from the inlet 124 and placed in the chamber 122 at a location distal from the inlet 124. During the depolymerization process, the depolymerization tank 120 can be rotated in a first direction to convey the solid feedstock 2S towards the inlet 124 and distribute the solid feedstock 2*s* throughout the chamber 122. When depolymerization of the solid feedstock 2S is complete, the depolymerization tank 120 can be rotated in a second direction opposite the first direction to convey the solid residue from the depolymerization process towards the solids outlet 128 and out of the chamber 122. As shown in FIG. 7B, the flights 130 are configured to deliver solid residue in the depolymerization chamber 122 to a conveying tube 134 when the depolymerization tank 120 is rotated in the second direction. The conveying tube 134 contains a second auger 136 for conveying the residue to the solids outlet 128. As a person of skill would understand, configuration of the flights 130 and the rotational speed of the depolymerization tank 120 must be configured to deliver the residue to the conveying tube 134. In embodiments, a chute could be used to direct residue in the depolymerization chamber 122 into the conveying tube 134.

Example Process

Figure 6:
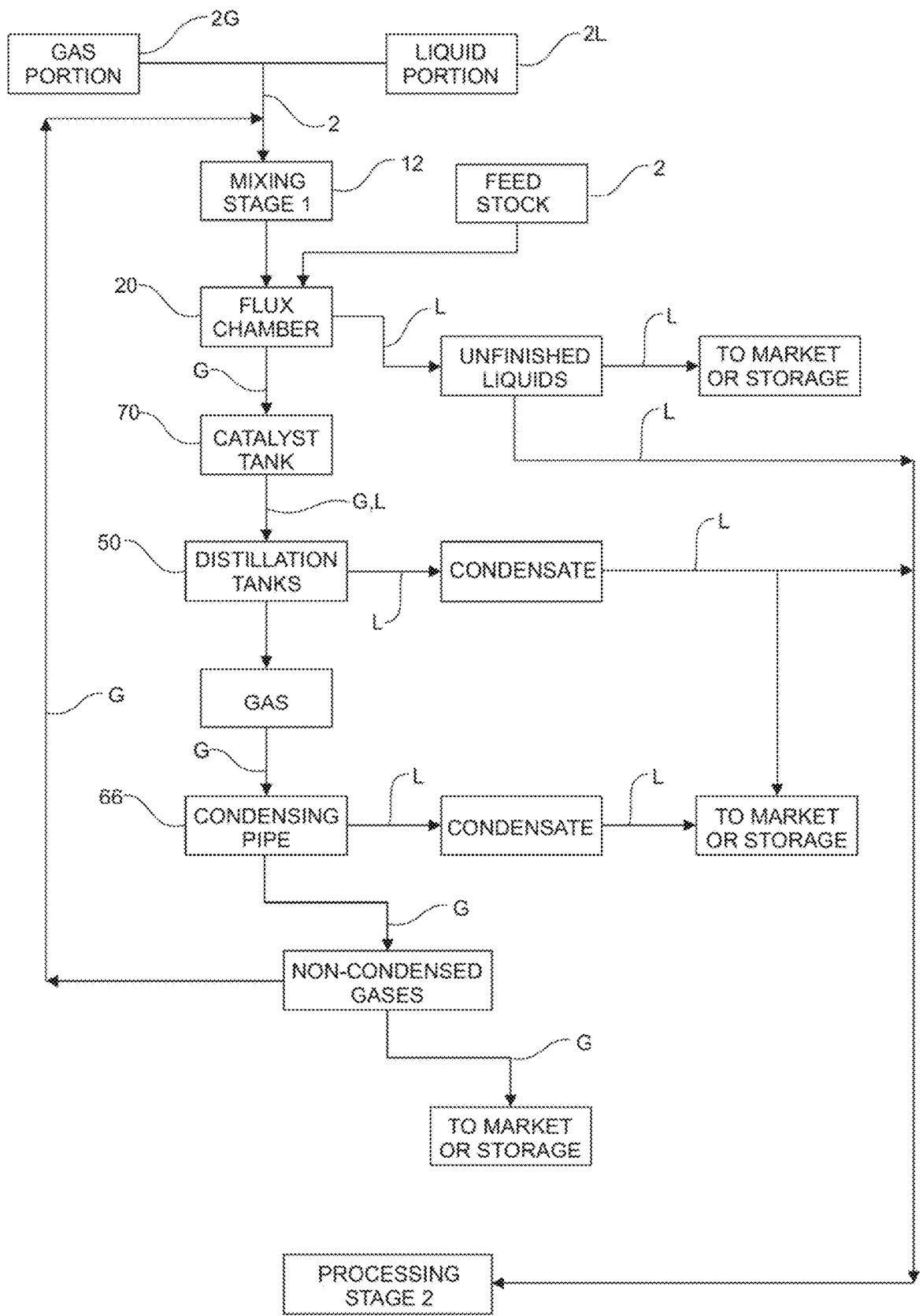
FIG. 6 is a flow diagram of one embodiment of a method for processing materials.

With reference to FIG. 6, one embodiment of a process for processing materials can comprise first delivering a gas portion 2G and liquid portion 2L to a mixing stage 12 to create a combined liquid feedstock 2. The combined liquid feedstock 2 can then be conveyed to the flux tank 20 of the decomposing section 14 to be broken down into gas and liquid products G,L. Additional liquid feedstock 2L, such as unstable or contaminated condensate, liquid and semi-liquid petroleum, and other off-specification products, can be conveyed into the flux tank 20 to be decomposed together with the combined liquid feedstock. Liquid product L from the flux chamber 20 can be removed therefrom and stored for sale/disposal, or transported to the mixing section 12*b* or flux tank 20*b* of a subsequent processing stage 18*b* for further processing. The gaseous product G produced from the reaction in the flux tank 20 exits and proceeds into a catalyst tank 70 of the condensing section 16 and is attracted to the catalyst material 82 embedded within the walls 80 of the accumulator element 76. The gaseous product condenses on the walls 80 of the accumulator element 76 and fall onto the retaining plate 88 of the catalyst tank 70, which directs the condensate into a downstream distillation tank 50. Uncondensed gases also proceed out of the outlet of the catalyst tank 70 into the distillation tank 50. The uncondensed gases undergo further condensation in the distillation tank 50 and are cooled by the cooling coil 58 therein. The condensate proceeds out of the distillation tank outlet 56 and, like the liquid product from the flux chamber 20, can be stored for sale/disposal, or transported to the mixing section 12*b* or flux tank 20*b* of a subsequent processing stage 18*b* for further processing. Gas product G still not condensed in the distillation tank 50 proceeds through the outlet to a condensing pipe 66 for a further stage of condensation. Condensate from the condensing pipe 66 can be stored, or transported to a subsequent processing stage 18*b* for further processing. Uncondensed gases G from the pipe 66 can be stored for sale/disposal, or recirculated to the mixing section 12 of the present processing stage 18, or a subsequent processing stage 18*b*.

We claim:

1. A system for processing a decomposable feedstock, comprising:
    a mixing stage for combining a liquid portion and a gas portion to form the feedstock, comprising
        a housing having a liquid inlet, gas inlet, and common outlet, and defining a mixing chamber having a driveshaft extending axially therethrough;
        one or more stationary plates mounted in the mixing chamber and generally perpendicular to the driveshaft, each stationary plate having at least a first circumferential array of a first plurality of teeth extending axially from the stationary plate in a first direction, first radial flow passages formed between adjacent first teeth; and
        one or more rotating plates, each rotating plate rotatably mounted on the driveshaft and having at least a second circumferential array of a second plurality of teeth extending axially from the rotating plate in a second direction, the second direction opposing the first direction and second radial flow passages formed between adjacent second teeth;
        wherein each stationary plate is coupled with a corresponding rotating plate to form a pair such that the at least the first circumferential array of the first plurality of teeth and the second circumferential array of the second plurality of teeth of corresponding stationary and rotating plates respectively occupy a common axial segment of the mixer, the first and second pluralities of teeth having a radial clearance therebetween, and the rotating plate is capable of being rotated relative to the corresponding stationary plate; a mixing flow path being formed through the first and second passages of the first circumferential arrays and the radial clearance; and wherein the liquid and gas flow along the flow path from the liquid and gas inlets respectively to the common outlet through the one or more pairs of stationary and rotating plates;

a processing tank configured to receive the feedstock within and having a field generator configured to generate an electromagnetic field within the processing tank at a target frequency range to decompose the feedstock to produce a gaseous product from the feedstock; and a catalyst located downstream of the processing tank for receiving and condensing the gaseous product to a liquid product, the catalyst comprising a catalyst material embedded within a non-reactive material.

2. The system of claim 1, wherein at least one of the stationary plates and rotating plates are made at least partially of a magnetic material.

3. The system of claim 1, further comprising a condensing stage having one or more distillation tanks for receiving and condensing the gaseous product to a liquid product.

4. The system of claim 3, wherein the one or more distillation tanks each have a cooling coil, and a current source electrically connected to the cooling coil for conducting a current therethrough.

5. The system of claim 1, further comprising a depolymerization tank located upstream from the processing tank, the depolymerization tank configured to receive a solid feedstock and having a second field generator configured to generate a depolymerizing electromagnetic field within the depolymerization tank at a second target frequency range to produce a second gaseous product from the feedstock.

6. The system of claim 5, wherein the depolymerization tank is rotatably mounted on a frame and driven to rotate the depolymerization tank.

7. A method for processing decomposable feedstock using the system of claim 1, comprising:
mixing a liquid portion and a gas portion of the feedstock to form a combined feedstock;
generating the electromagnetic field to decompose the feedstock and produce the gaseous product therefrom; and
condensing the gaseous product to produce the liquid product.

8. The method of claim 7, wherein mixing the liquid portion and gas portion of the feedstock comprises shearing the liquid portion and gas portion to cavitate the liquid portion in the presence of the gas portion.

9. The method of claim 7, wherein the step of condensing the gaseous product comprises condensing the gaseous product in the presence of a catalyst material.

10. The method of claim 7, wherein the step of condensing the gaseous product comprises cooling the gaseous product.

11. The method of claim 7, wherein the step of cooling the gaseous product further comprises exposing the gaseous product to a second electromagnetic field.

12. The system of claim 1, wherein the field generator comprises a conductive wire coiled about a hollow pipe.

13. The system of claim 12, wherein the hollow pipe is coupled to a pump configured to circulate a coolant therethrough.

14. The system of claim 13, wherein the coolant contains ferromagnetic particles.

15. The system of claim 1, wherein the catalyst further comprises:
a housing defining a catalyst chamber therein;
an inlet for receiving the gaseous product into the catalyst chamber;
an accumulator element located in the chamber and comprising the catalyst material embedded within a non-reactive material; and
an outlet for permitting a liquid product to exit the catalyst chamber;
wherein the catalyst material is selected to attract the gaseous product.

16. The system of claim 15, further comprising a retaining plate located in the housing below the accumulator element, the retaining plate having a plurality of openings sized to permit the gas product to pass therethrough, but retain and direct at least some of the liquid product to the outlet.

17. A system for processing a decomposable feedstock, comprising:
a processing tank configured to receive the feedstock within and having a field generator configured to generate an electromagnetic field within the processing tank at a target frequency range to decompose the feedstock to produce a gaseous product from the feedstock; and
a condensing stage having one or more distillation tanks for receiving and condensing the gaseous product to a liquid product, wherein the one or more distillation tanks each have a cooling coil and a current source electrically connected to the cooling coil for conducting a current therethrough.

18. A system for processing a decomposable feedstock, comprising:
a processing tank configured to receive the feedstock within and having a field generator configured to generate an electromagnetic field within the processing tank at a target frequency range to decompose the feedstock to produce a gaseous product from the feedstock;
a depolymerization tank rotatably mounted on a frame and located upstream from the processing tank, the depolymerization tank configured to receive a solid feedstock and having a second field generator configured to generate a depolymerizing electromagnetic field within the depolymerization tank at a second target frequency range to produce a second gaseous product from the combined feedstock.

19. A system for processing a decomposable feedstock, comprising:
a processing tank configured to receive the feedstock within and having a field generator configured to generate an electromagnetic field within the processing tank at a target frequency range to decompose the feedstock to produce a gaseous product from the feedstock;
a mixing stage for combining a liquid portion and a gas portion to form the feedstock, comprising
a housing having a liquid inlet, gas inlet, and common outlet, and defining a mixing chamber having a driveshaft extending axially therethrough;
one or more stationary plates mounted in the mixing chamber and generally perpendicular to the driveshaft, each stationary plate having at least a first circumferential array of a first plurality of teeth extending axially from the stationary plate in a first direction, first radial flow passages formed between adjacent first teeth; and one or more rotating plates, each rotating plate rotatably mounted on the driveshaft and having at least a second circumferential array of a second plurality of teeth extending axially from the rotating plate in a second direction, the second direction opposing the first direction and second radial flow passages formed between adjacent second teeth;

wherein each stationary plate is coupled with a corresponding rotating plate to form a pair such that the at least the first circumferential array of the first plurality of teeth and the second circumferential array of the second plurality of teeth of corresponding stationary and rotating plates respectively occupy a common axial segment of the mixer, the first and second pluralities of teeth having a radial clearance therebetween, and the rotating plate is capable of being rotated relative to the corresponding stationary plate; a mixing flow path being formed through the first and second passages of the first circumferential arrays and the radial clearance; and wherein the liquid and gas flow along the flow path from the liquid and gas inlets respectively to the common outlet through the one or more pairs of stationary and rotating plates.

\* \* \* \* \*